US008904493B1

(12) United States Patent
Dibble

(10) Patent No.: US 8,904,493 B1
(45) Date of Patent: Dec. 2, 2014

(54) IMAGE-BASED CHALLENGE-RESPONSE TESTING

(75) Inventor: Peter Cadwell Dibble, Bethel Park, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/597,533

(22) Filed: Aug. 29, 2012

(51) Int. Cl.
  *G06F 21/00* (2013.01)
  *G06F 21/36* (2013.01)
  *H04L 29/06* (2006.01)

(52) U.S. Cl.
  CPC ........ *G06F 21/36* (2013.01); *G06F 2221/2103* (2013.01); *H04L 63/08* (2013.01); *H04L 63/10* (2013.01); *G06F 2221/2133* (2013.01); *H04L 2463/144* (2013.01)
  USPC ............................................................. 726/4

(58) Field of Classification Search
  None
  See application file for complete search history.

(56) References Cited

U.S. PATENT DOCUMENTS

| 8,209,741 | B2 * | 6/2012 | Elson et al. ...................... 726/2 |
| 8,296,659 | B1 * | 10/2012 | Antypas, III .................. 715/741 |
| 8,607,331 | B2 * | 12/2013 | Sun et al. ........................ 726/19 |
| 2008/0066014 | A1 * | 3/2008 | Misra ............................ 715/846 |
| 2009/0077629 | A1 * | 3/2009 | Douceur et al. .................. 726/2 |
| 2010/0325706 | A1 * | 12/2010 | Hachey ............................. 726/6 |
| 2011/0081640 | A1 * | 4/2011 | Tseng et al. ................... 434/362 |
| 2011/0191820 | A1 * | 8/2011 | Ivey .................................. 726/3 |
| 2013/0007875 | A1 * | 1/2013 | Jakobsson et al. .............. 726/19 |
| 2013/0019278 | A1 * | 1/2013 | Sun et al. .......................... 726/2 |
| 2013/0145441 | A1 * | 6/2013 | Mujumdar et al. ............... 726/5 |

OTHER PUBLICATIONS

Bruno Norberto da Silva, Ana Cristina Bicharra Garcia; "A Hybrid Method for Image Taxonomy: Using CAPTCHA for Collaborative Knowledge Acquisition"; American Association for Artificial Intelligence, pp. 1-7, 2006.*

* cited by examiner

*Primary Examiner* — Andrew Nalven
*Assistant Examiner* — Christopher Ruprecht
(74) *Attorney, Agent, or Firm* — Patent Law Works LLP

(57) ABSTRACT

Various implementations for verifying that a user device is being operated by a person are described. In some implementations, a method includes receiving a challenge request. The method selects two or more first images from a first image category and one or more second images from one or more second image categories, which are distinct from the first image category. The method sends a challenge to the user device for presentation to the person. The challenge includes a challenge parameter and data describing the two or more first images and the one or more second images. The method receives a challenge response from the user device describing a user selection of at least one image from among the two or more first images and the one or more second images and determines a result of the challenge based on the challenge response and the challenge parameter.

27 Claims, 13 Drawing Sheets

IMAGE-BASED CHALLENGE-RESPONSE TESTING

BACKGROUND

The present disclosure relates to electronic communication. In particular, the present disclosure relates to image-based challenge-response testing.

Internet bots, also referred to as web robots, are often used to collect information and perform automated tasks on the Internet. In some cases, Internet bots are used to emulate human activity, such as inputting various information into a web-based form and submitting that information. To ensure humans are using an online service and not Internet bots, a challenge-response test can be used, which requires a test, which is formulated to be simple for a human, but difficult for a machine to complete, to be completed before access to a particular resource is granted.

However, usage of these types of challenge-response tests has, in some cases, resulted in the development of increasingly sophisticated Internet bots which can circumvent the challenge-response tests. In response, the various challenge-response tests have, in some cases, become more obscure to prevent circumvention by these Internet bots. Consequently, these tests have also become increasingly difficult and onerous for human users to complete successfully, and can discourage these users from using or signing up for online services that require challenge-response testing.

SUMMARY

The present disclosure overcomes the deficiencies and limitations discussed in the Background section at least in part by providing innovative systems and methods for verifying that a user device, which is seeking access to a software service, is being operated by a person. In one aspect, various systems and methods include receiving a challenge request to verify a person is operating a user device, selecting two or more first images from a first image category, and selecting one or more second images from one or more second image categories. The one or more second image categories are distinct from the first image category. The systems and methods further include sending a challenge to the user device for presentation to the person. The challenge includes a challenge parameter and data describing the two or more first images and the one or more second images. The systems and methods receive a challenge response from the user device describing a user selection of at least one image from among the two or more first images and the one or more second images, and determine a result of the challenge based on the challenge response and the challenge parameter.

The systems and methods may further include providing authorization for the user device to access a software service if the result of the challenge is determined to be successful. The determination of the result may include determining the result of the challenge to be successful if the user selection satisfies the challenge parameter. The systems and methods may also include selecting an uncategorized image and categorizing the uncategorized image into the first image category based on the result. The challenge may include the uncategorized image, the user selection may associate the uncategorized image with the first image category, and the determination of the result of the challenge may include a determination that the result of the challenge is successful. The systems and methods may also include querying a data store for evidence associating the uncategorized image with the first image category. The evidence may be based on one or more challenge responses that were previously received and which associate the uncategorized image with the first image category. The systems and methods may determine an evidence threshold to be met based on the evidence and the result, and the categorization of the uncategorized image may be further based on the evidence threshold being met.

In another aspect, various systems and methods include receiving a challenge request to verify a person is operating a user device, selecting two or more first images based on pre-determined attribute values, and selecting a second image having an unknown attribute value. The systems and methods include sending a challenge to the user device for presentation to the person. The challenge includes a challenge parameter and data describing the two or more first images and the second image. The challenge parameter may instruct the person to select or sort the first and second images based on a challenge parameter. The systems and methods receive a challenge response from the user device describing a user input, and determine a result of the challenge based on the challenge response and the challenge parameter. The systems and methods may further include authorizing the user based on the result and determining an attribute value for the second image based on the result.

Other aspects include corresponding systems, methods, and apparatus, including computer program products. The technology described herein is particularly advantageous in a number of respects. For example, the technology may provide a challenge to a user that is difficult for an automated program to circumvent by, for example, reverse engineering but is easily completable by a human user; may select images based on attribute values determined for the images to reduce the probability of an automated program circumventing the challenge; may leverage input provided by a user to categorize an uncategorized image or determine an undefined attribute for a given image; etc. It should be understood that this list of features and advantages is provided by way of example and is not all-inclusive, as many additional features and advantages fall within the scope of the present disclosure. Moreover, it should be noted that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example Overview

Figure 1:
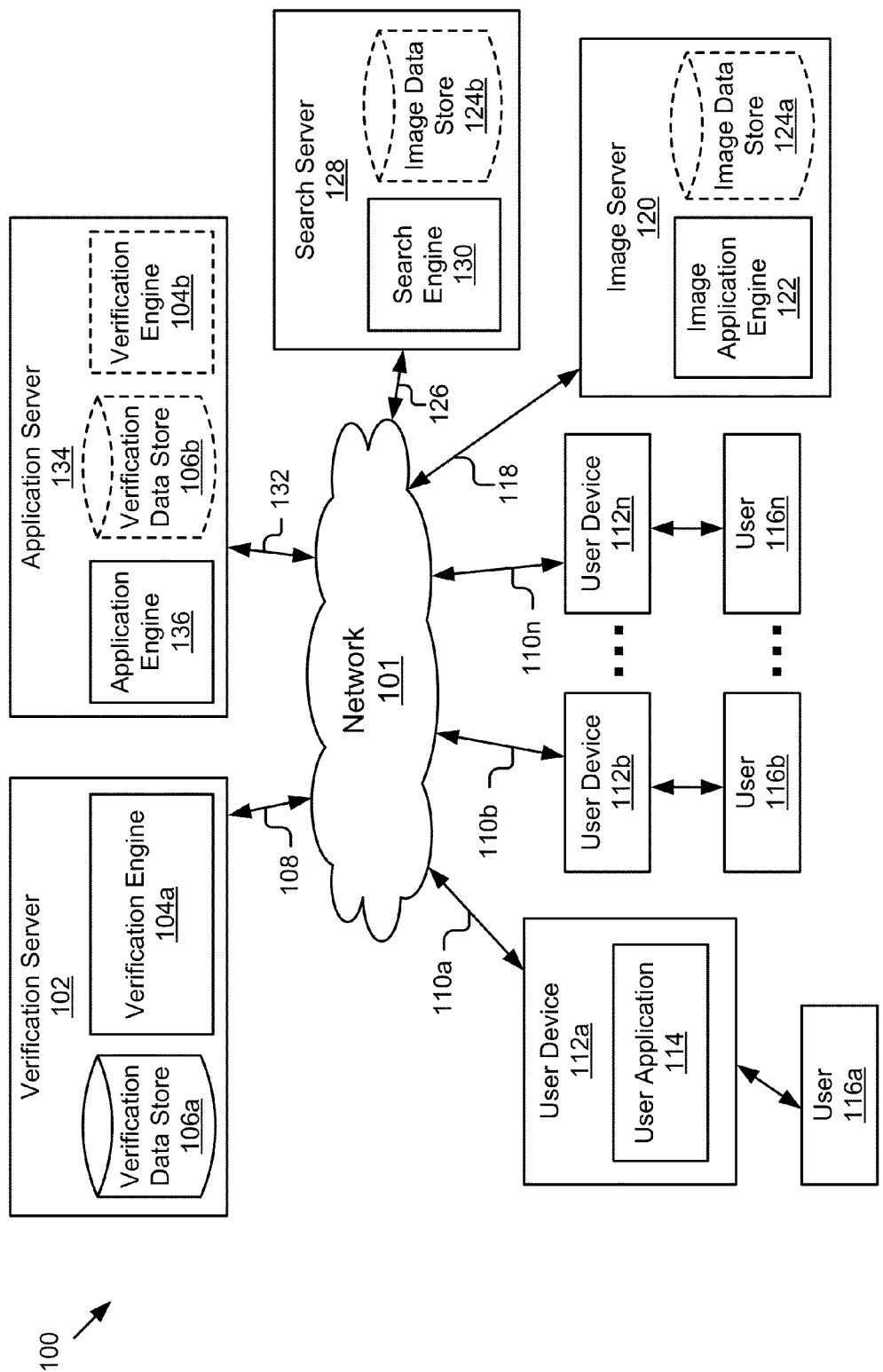
FIG. 1 is a block diagram illustrating an example system for challenging a user seeking access to a software service.

In some embodiments, the technology described herein includes systems and methods for verifying that a user device, which is seeking access to a software service, is being operated by a person. For example, the systems and methods receive a challenge request to verify a person is operating the user device. In response, the system and methods select two or more first images from a first image category and one or more second images from one or more second image categories, the one or more second image categories being distinct from the first image category. For instance, three related images can be selected from a tools category that depict various different hand tools, and two unrelated images, such as an image of bicycle handles and an image of stool, can be respectively selected from two other categories, such as a replacement parts category and a home furnishings category. In this way, the related images can be easily distinguished from the unrelated images by a person viewing them. The challenge includes data describing these images and a challenge parameter. The challenge parameter may describe how the images should be interacted with by the person to which the challenge is being sent. For instance, the challenge parameter may instruct the person to select the images that do not belong to the first category.

Responsive to the sending of the challenge, these systems and methods receive a challenge response from the user device describing a user selection of at least one image from among the two or more first images and the one or more second images. The systems and methods then determine a result of the challenge based on the challenge response and the challenge parameter. For instance, the systems and methods may determine a result of the challenge to be successful if the user selection satisfies the challenge parameter. The challenge parameter may, in some examples, require the user to only select all the images from the first category or the second category. If the result of the challenge is determined to be successful, the systems and methods can provide authorization for the user device to access the software service.

In various embodiments, the systems and methods may include an uncategorized image in the challenge and, based on the user selection included in the challenge response, may categorize the uncategorized image. For example, the systems and methods may categorize the uncategorized image into the first image category if the user selection associates the uncategorized image with the first image category and the result of the challenge is determined to be successful. In this way, in addition to verifying that a person is operating the user device, uncategorized images may be reliably categorized. The systems and methods may also aggregate a plurality of images from one or more information sources, categorize these images, and determine attribute values for these images based on the object(s) that are depicted by them. These attributes may then be used to select the images from the first category and/or one or more second categories for the challenge. For example, selecting images having widely disparate attribute values from a particular category results in the selection of images that are related but that depict objects that are clearly distinct from one another in size, color and/or shape, etc. This is advantageous as it can prevent circumvention of the challenge by a sophisticated agent, such as an Internet bot, that is capable of correctly identifying images, which depict similarly sized, shaped, and colored objects, as being related. More specifically, this can prevent the agent from achieving a high challenge success rate by grouping images based on any easily-measured attribute such as brightness, color distribution, or number of lines.

It should be understood that these example systems and methods are provided by way of illustration and that other variations are described herein and fall within the scope of the present disclosure.

Example System

FIG. 1 is a block diagram illustrating an example system 100 for challenging a user seeking access to a software service. The illustrated system 100 includes a network 101, a verification server 102, one or more client/user devices 112a, 112b . . . 112n (also referred to herein individually and collectively as 112) that are accessible by users 116a, 116b . . . 116n (also referred to herein individually and collectively as 116), an image server 120, a search server 128, and an application server 134. In the illustrated embodiment, the entities 102, 112a . . . 112n, 120, 128, and 134 are electronically communicatively coupled via the network 101. However, the present disclosure is not limited to this configuration and the entities of system 100 may be connected to and/or interconnected by any number of networks, or may be integrated or interconnected into a single device or system without the use of a network.

In the depicted embodiment, the verification server 102 is coupled to the network 101 via signal line 108, and interacts with the other entities 112a . . . 112n, 120, 128, and 134 of the system 100 via the network 101. In some embodiments, the verification server 102 includes one or more processors and one or more storage devices storing data or instructions for execution by the one or more processors. Although only one verification server 102 is shown, multiple verification servers 102 may be included in the system 100.

The verification server 102, as depicted, includes a verification engine 104a (also referred to herein as 104), and a verification data store 106a (also referred to herein as 106). The verification engine 104 is software, code, logic, or routines for verifying that a user device 112, which is seeking access to a software service, is being operated by a person. Additional structure and functionality of the verification engine 104 and the verification data store 106 are further described below with reference to at least FIG. 2.

In some embodiments, an instance 104a of the verification engine 104 is included in and operable on the verification server 102. In other embodiments, an instance 104b of the verification engine 104 may be included in and operable on the application server 134. An instance 104b of the verification engine 104 may also be included in the application server 134 or another entity coupled to the server, such as a user device 112, in addition to or in the place of being included in the verification server 102.

The user devices 112a, 112b . . . 112n are computing devices having data processing and data communication capabilities. In some embodiments, a user device 112 may include a processor, a memory, a power source and one or more network interfaces coupled via a data bus, where one or more network interfaces broadcast and receive control data, voice data, and/or network data via radio signals. For example, the user devices 112 may include one or more wired or wireless network interfaces for sending and receiving network data; a graphics processor; a high-resolution touchscreen; a physical keyboard; forward and rear facing cameras; sensors such as accelerometers and/or gyroscopes; a GPS receiver; a Bluetooth module; memory storing applicable firmware; and various physical connection interfaces (e.g., USB, HDMI, headset jack, etc.); etc. Additionally, an operating system for managing the hardware and resources of the user device 112, application programming interfaces (APIs) for providing applications access to the hardware and resources, a user interface module for generating and displaying interfaces for user interaction and input, and applications such as applications for making phone calls, video calls, web browsing, messaging, social networking, gaming, capturing digital video and/or images, etc., may be stored and operable on the user device 112.

In some embodiments, a user device 112 is a computing device such as a workstation computer, a desktop computer, a laptop computer, a netbook computer, a tablet computer, a smartphone, a set-top box/unit, a television with one or more processors embedded therein or coupled thereto and capable of receiving viewer input, accessing video content on computer networks such as the Internet, and executing software routines to provide enhanced functionality and interactivity to viewers, or the like. In other embodiments, different user devices 112a, 112b . . . 112n comprise different types of computing devices. For example, the user device 112a is a laptop, the user device 112b is a tablet computer, and the user device 112n is a smartphone. In some embodiments, the user device 112 is a client or terminal device.

The user devices 112a, 112b . . . 112n in FIG. 1 are provided by way of example. While FIG. 1 illustrates three or more user devices 112, the present disclosure applies to any system architecture having one or more user devices 112. In the depicted embodiment, the user device 112a, with which user 116a interacts, is coupled to the network 101 via signal line 110a. The user devices 112b and 112n, with which the users 116b and 116n respectively interact, are coupled to the network 101 via signal lines 110b and 110n, respectively.

In the depicted embodiment, the user device 112a contains a user application 114 executable by a processor (not shown) of the user device 112 to provide for user interaction, and to send and receive data via the network 101. In particular, the user application 114 is operable to instruct the user device 112 to render user interfaces, receive user input, and send information to and receive information from the verification engine 104. While in FIG. 1, just the user device 112a is depicted as including the user application 114, any number of user devices 112 may include an instance of the user application 114. In these or other embodiments, the user application 114 is stored in a memory (not shown) of the user device 112a and is accessible and executable by a processor (not shown).

In some embodiments, the user application 114 generates and presents user interfaces to a user 116 via a display (not shown). For example, the user application 114 may generate and present the user interfaces 700 and 800 depicted in FIGS. 7 and 8 based at least in part on information received from the verification engine 104 via the network 101. In some embodiments, the user application 114 is code operable in a browser launched on the user device 112a, the browser receives interface instructions from the verification engine 104a of the verification server 102 via the network 101 in the form of a mark-up language (e.g., HTML, XML, etc.), style sheets (e.g., CSS, XSL, etc.), graphics, and/or scripts (e.g., JavaScript, ActionScript, etc.), and the browser interprets the interface instructions and renders an interactive Web User Interface (WUI) for display on the user device 112a based thereon. In other embodiments, some or all of the interface instructions are provided by the user application 114 while the verification information is provided by the verification engine 104. Other variations are also contemplated and within the scope of this disclosure. The user application 114 is also operable to receive input signals from the user 116a via an input device (not shown) of the user device 112a, and to send information to the verification engine 104 via a communication unit (not shown) coupled to the network 101, such as one like or substantially similar to the communication unit 226.

The network 101 includes one or more wired or wireless networks and may have any number of configurations such as a star configuration, token ring configuration or other known configurations. The network 101 may include a local area network (LAN), a wide area network (WAN) (e.g., the Internet), and/or any other interconnected data path across which multiple devices may communicate. The network 101 may be coupled to or include mobile (cellular) networks including distributed radio networks and a hub providing a wireless wide area network (WWAN), or other telecommunications networks. In some embodiments, the network 101 may include Bluetooth communication networks for sending and receiving data. The network 101 may transmit data using a variety of different communication protocols including user datagram protocol (UDP), transmission control protocol (TCP), hypertext transfer protocol (HTTP), hypertext transfer protocol secure (HTTPS), file transfer protocol (FTP), direct data connection, wireless access protocol (WAP), various email protocols, etc. User devices 112 may couple to and communicate via the network 101 using a wireless and/or wired connection. In some embodiments, the communication unit (not shown) of the user devices 112 include a wireless network interface controller for sending and receiving data packets to an access point of the network 101. For example, the user devices 112 may be Wi-Fi enabled devices which connect to wireless local area networks (WLANs), such as wireless hotspots. The user devices 112 may also include one or more wireless mobile network interface controllers for sending and receiving data packets via a WWAN of the network 101.

The image server 120 is a computing device or system for providing graphical images to the other entities of the system 100 via the network 101. In the depicted embodiment, the image server 120 is electronically communicatively coupled to the network 101 via signal line 118 for communication with the other components of the system 100. In some implementations, the image server 120 may provide a network-based image management service to its end-users. For example, users 116 may use a user interface associated with the image management service to upload and organize, publish and share photographs with other users 116. In other embodiments, the image server 120 may provide an online marketplace for selling products and may store and serve graphical images of those products to other entities of the system 100 via the network 101. It should be understood that the image server 120 is not limited to providing the above-noted services and may include any other network-based or cloud-based service that involve the provision of images to users 116.

The search server 128 is a computing device or system that includes a search engine 130 for retrieving results that match search terms from an image data store. In the depicted embodiment, the search server 128 is communicatively coupled to the network 101 via signal line 126. The other entities of the system 100 may interact with the search engine 130 via the network 101 to retrieve the results matching various search terms provided to the search engine 130. For example, the verification engine 104 may signal the search engine 130 to provide search results that include images of an object or object type. In some embodiments, the search results may be filtered by the search engine 130 to include particular categories of images, such as images of products, place, people, animals, etc. Although, only one search server 128 is shown, it should be understood that multiple search servers 128 may be included in the system 100.

The image server 120 and the search server 128 may each include an image data store 124 for locally storing the images served by the image server 120. The image server 120 and the search server 128 may each include distinct and independent instances of the image data store 124 (e.g., 124a and 124b) or may share the same image data store 124. In some embodiments, the image data store 124 may be a cloud-based storage system distributed across network 101. Various additional structure and functionality of the image data store 124 are discussed in further detail below.

The application server 134 is a computing device or system for providing various computing functionalities, services, and/or resources to the other entities of the system 100. In the depicted embodiment, the application server 134 is communicatively coupled to the network 101 via signal line 132 for communication with the other components of the system 100. In the depicted embodiment, the application server 134 includes an application engine 136. The application engine 136, in some embodiments, is a network-based software service operable to provide the computing functionalities, services, and/or resources, and to send data to and receive data from the other entities of the network 101. For example, the application engine 136 may provide users 116 with a service for user account management, internet searching; social networking; web-based email; blogging; micro-blogging; photo management; video, music and multimedia hosting, distribution, and sharing; business services; news and media distribution; or any combination of the foregoing services. It should be understood that the application server 134 is not limited to providing the above-noted services and may include any other network-based or cloud-based service.

The application server 134 may, in some embodiments, include an instance 104b of the verification engine 104 along with an instance 106b of the verification data store 106, and thus locally access/utilize the functionality provided by the verification engine 104. In other embodiments, the application server 134 may interact with verification server 102 via the network 101 to access/utilize the functionality of the verification engine 104. For simplicity, a single block for the application server 134 is shown in FIG. 1. However, in this or other implementations, several distinct third-party servers (not shown) may be coupled to the network 101 via distinct signal lines which operate applications providing distinct or competing functionalities and/or resources.

In some embodiments, application server 134, and more particularly, the application engine 136 may require users 116 to be registered to use the services provided thereby. In some embodiments, to register to use the application engine 136, the application engine 136 may require a user 116 to provide identifying information, for example, a valid electronic mail address and password, and the application may test the validity of the electronic mail address by sending the a confirmation message to the address containing instructions for confirming the account (e.g., selecting a hyperlink to a confirmation webpage operated by the service provider). In other embodiments, the application engine 136 may interact with a federated identity server (not shown) to register/authenticate users 116. Once registered, the application engine 136 may require a user 116 seeking access to authenticate by inputting the identifying information in an associated user interface.

The verification server 102, the image server 120, the search server 128, and the application server 134 may each include a server, server array or any other computing device, or group of computing devices, having data processing, storing and communication capabilities. In these or other embodiments, the servers 102, 120, 128, and/or 134 may include a virtual server (i.e., a virtual machine) implemented via software, which operates in a host server environment and accesses the physical hardware of the host server including, for example, a processor, memory, storage, network interfaces, etc., via an abstraction layer (e.g., a virtual machine manager). In these or other embodiments, the servers 102, 120, 128, and/or 134 may be implemented using a cloud-based architecture, with its software components operating as a service on one or more servers distributed through the network 101. It should be understood that the servers 102, 120, 128, and/or 134 can be stored in any combination of devices and servers, or in only one device or server. In some embodiments, the servers 120, 128, and 134 may include one or more computing devices having the same or similar computer architecture as the verification server 102 described with reference to FIG. 2.

The verification data store 106 and the image data store 124 are information sources for storing and providing access to stored data. In some embodiments, the verification data store 106 and/or the image data store 124 are or may be included in local memory devices. For example, the verification data store 106 may be included in a memory, such as the memory 222 (see FIG. 2A) of the verification server 102, and the image data store 124 may be included in a memory (not shown) of the search server 128, the image server 120, and/or the application server 134. In other embodiments, the verification data store 106 and the image data store 124 may be or included in distributed data stores, such as a computing/storage devices adapted for information storage and retrieval. In some embodiments, the verification data store 106 and/or the image data store 124 may include a database management system (DBMS) operable by or accessible to the verification server 102. For example, the DBMS could be a structured query language (SQL) DBMS. In these embodiments, the verification data store 106 and the image data store 124 may, in cooperation with one or more computing devices, store data in an object-based data store or multi-dimensional tables comprised of rows and columns, and manipulate, i.e., insert, query, update and/or delete, data entries stored in the verification data store 106 using programmatic operations (e.g., SQL queries and statements or a similar database manipulation library).

Example Verification Server 102

Figure 2A:
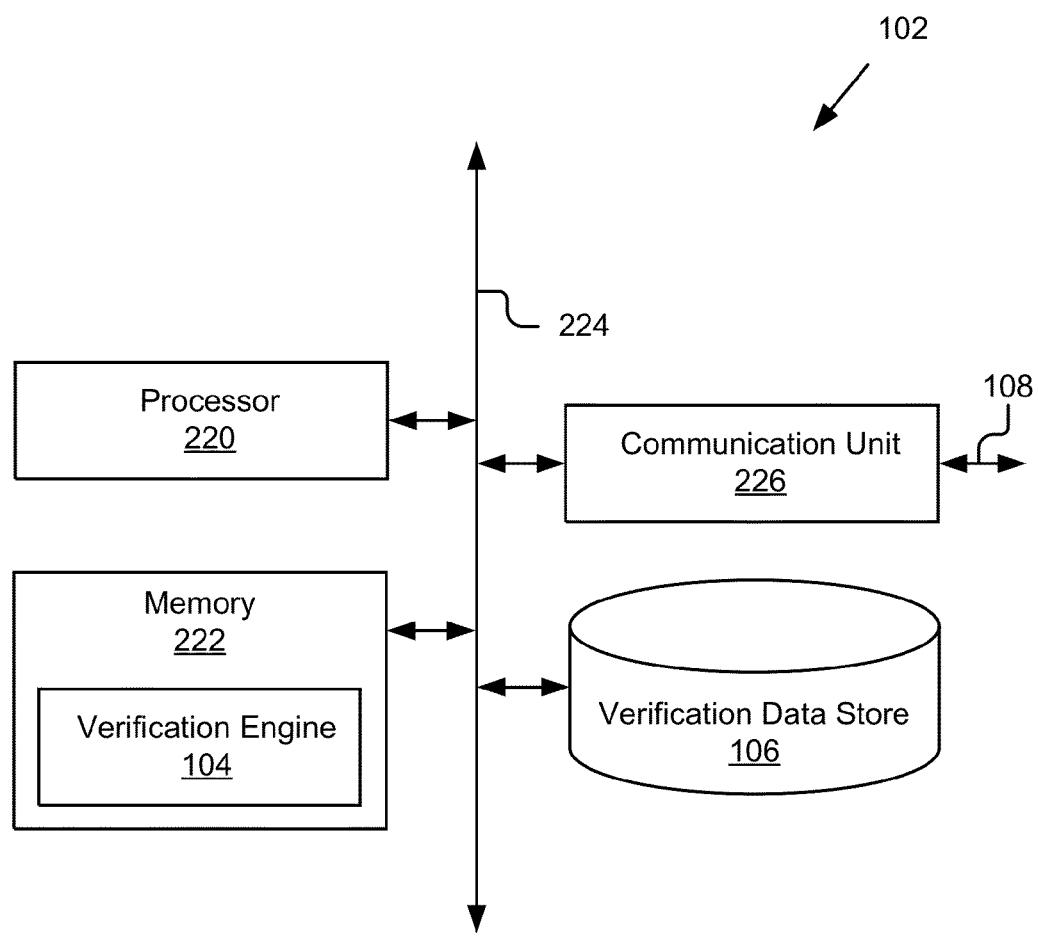
FIG. 2A is a block diagram of an example verification server.

FIG. 2A is a block diagram of an example verification server 102. In the depicted embodiment, the verification server 102 is a computing device comprising a verification data store 106, a processor 220, a memory 222 storing a verification engine 104, and a communication unit 226. The components 106, 220, 222, and 226 are communicatively coupled via a communication bus 224. The bus 224 can include a conventional communication bus for transferring data between components of a computing device or between computing devices, a network bus system including the network 101 or portions thereof, a processor mesh, a combination thereof, etc.

The processor 220 includes an arithmetic logic unit, a microprocessor, a general purpose controller, or some other processor array to perform computations and provide electronic display signals to a display device (not shown). The processor 220 may be coupled to the bus 224 for communication with the other components of the verification server 102. The processor 220 may process data signals and may have various computing architectures including a complex instruction set computer (CISC) architecture, a reduced instruction set computer (RISC) architecture, or an architecture implementing a combination of instruction sets. Although only a single processor 220 is shown in FIG. 2A, multiple processors may be included and each processor may include a single processing core or multiple interconnected processing cores. The processor 220 may be capable of supporting the display of images, the capture and transmission of images, perform complex tasks, including various types of feature extraction and sampling, etc. It should be understood that the verification server 102 may include various operating systems, sensors, displays, additional processors, and other physical configurations.

The memory 222 stores instructions and/or data that may be executed by the processor 220. In the depicted embodiment, the memory 222 stores at least the verification engine 104. In other embodiments, such as an embodiment where FIG. 2A represents the computer architecture of the application server 134, the memory 222 may also store the application engine 136. In the forgoing embodiments, the memory 222 is also capable of storing other instructions and data such as an operating system, hardware drivers, other software applications, databases, etc. The memory 222 is coupled to the bus 224 for communication with the processor 220 and the other components of verification server 102. The instructions and/or data may comprise code for performing any and/or all of the techniques described herein. In particular, the memory 222 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 220. A non-transitory computer-usable storage medium may include any and/or all computer-usable storage media. In some implementations, the memory 222 may include volatile memory, non-volatile memory, or both. For example, the memory 222 may include a dynamic random access memory (DRAM) device, a static random access memory (SRAM) device, flash memory, a hard disk drive, a floppy disk drive, a CD ROM device, a DVD ROM device, a DVD RAM device, a DVD RW device, a flash memory device, or any other mass storage device known for storing information on a more permanent basis. It should be understood that the memory 222 may be a single device or may include multiple types of devices and configurations.

The communication unit 226 is coupled to the network 101 by the signal line 108 and coupled to the bus 224. In some embodiments, the communication unit 226 includes network interface devices (I/F) for wired and wireless connectivity with the network 101. For example, the communication unit 226 may include a CAT-5 interface, USB interface, or SD interface, transceivers for sending and receiving signals using Wi-Fi™, Bluetooth® or cellular communications for wireless communication, etc. The communication unit 226 can link the processor 220 to the network 101 that may in turn be coupled to other processing systems. The communication unit 226 can provide other connections to the network 101 and to other entities of the system 100 using standard communication protocols including, for example, TCP/IP, HTTP, HTTPS, SMTP, etc.

The verification data store 106 is an information source capable of storing and providing access to data. In the depicted embodiment, the verification data store 106 is coupled for communication with the components 220, 222, and 226 of the verification server 102 via the bus 224, and coupled, via the processor 220, for communication with the acquisition module 202, the categorization module 204, the attribute generator 206, the pre-processor 208, the challenge generator 210, the response analyzer 212, the learning module 214, and the API module 216. In some embodiments, the components 202, 204, 206, 208, 210, 212, 214, and 216 are configured to manipulate, i.e., store, query, update, and/or delete, data stored in the verification data store 106 using programmatic operations.

The data stored by the verification data store 106 may include information generated, received, or sent by the verification engine 104 and/or its constituent components including the acquisition module 202, the categorization module 204, the attribute generator 206, the pre-processor 208, the challenge generator 210, the response analyzer 212, the learning module 214, and the API module 216. In some embodiments, the verification data store 106 may include an ontology database or graph which describes all of the main categories and subcategories and their relationships to one another, and the challenge generator 210 may reference this table when selecting the first and second image categories.

For example, the verification data store 106, in cooperation with the verification engine 104, maintains a collection of image records containing graphical images categorized based on an ontological classification scheme. The image records may additionally or alternatively be organized based on stored attributes associated with the graphical images included in the records. The verification data store 106 may also store information related to challenge requests, challenges, challenge responses, image attributes/metadata, learning data, image evidence, etc., as discussed in further detail elsewhere herein.

Example Verification Engine 104

The verification engine 104 is software, code, logic, or routines for verifying that a user device 112, which is seeking access to a software service, is being operated by a person. In some embodiments, the verification engine 104 can generate a challenge, send it to the user device 112 for presentation to the user 116 operating the user device 112, receive a challenge response from the user device 112, and analyze the challenge response to determine whether a person is operating the user device 112. The verification engine 104 may also advantageously perform additional processing to categorize an image and/or determine an image attribute based on the user's response.

In addition to its conventional meaning, a challenge includes a request for a user 116 to perform a specified action. In some embodiments, the challenge includes one or more challenge parameters and data describing a plurality of images. The data describing the plurality of images may be instances of the images themselves, electronic references indicating an electronic location of the images, such as uniform resource locators (URL), a combination of the foregoing, etc. The challenge parameter may be an instruction for the user 116 to perform a certain action in association with the images in the challenge. For example, the challenge parameter may request a user 116 to select or sort (e.g., associate, rank, or otherwise organize) one or more of the images, as described in further detail below with reference to FIGS. 3-6, for example. By way of further illustration, the challenge parameter may require the person to select the two or more first images that belong to the first image category and not select the one or more second images that belong to the one or more second image categories; and a requirement that the user selection select the one or more second images that belong to the one or more second image categories and not select the two or more first images that belong to the first image category.

The verification engine 104 may generate the challenge responsive to receiving a challenge request or may autonomously generate the challenge. In some embodiments, the verification engine 104 may receive a challenge request from another entity of the system 100, such as a user device 112 or the application server 134, via the communication unit 226 and the network 101. For example, the user device 112 or the application server 134 may transmit a challenge request in the form of an http request and the verification engine 104 may respond by generating and sending a challenge in the form of an http response. Other communication protocols, such as those described with reference to the network 101, may also be used to send and receive, a challenge request, a challenge, and a challenge response.

In some embodiments, such as the example embodiments depicted in FIGS. 1 and 2A, the verification engine 104 may interact and communicate with one or more instances of the application engine 136, the verification data store 106, and the user application 114. The verification engine 104 may be stored and operable on any of the entities coupled to the network 101, such as the verification server 102, the application server 134, and/or a user device 112.

Figure 2B:
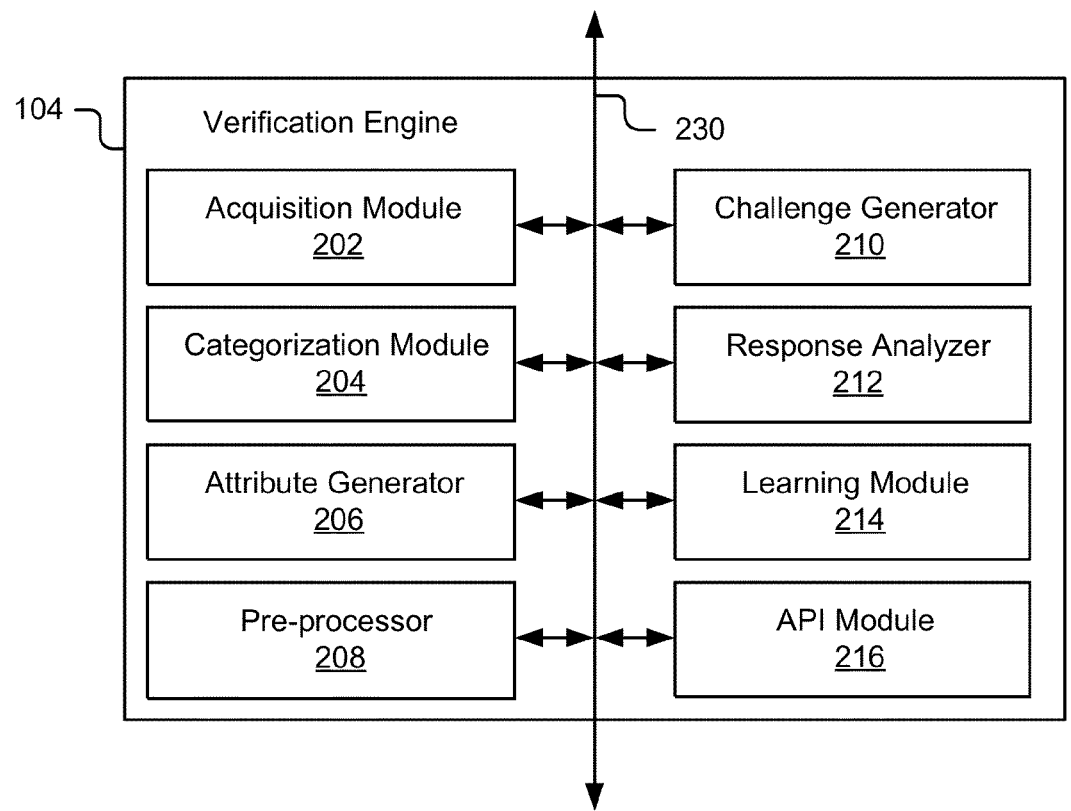
FIG. 2B is a block diagram of an example verification engine.

In the embodiment depicted in FIG. 2B, the verification engine 104 includes an acquisition module 202, a categorization module 204, an attribute generator 206, a pre-processor 208, a challenge generator 210, a response analyzer 212, a learning module 214, and an API module 216 that communicate over a software communication mechanism 230. The software communication mechanism 230 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.). The software communication mechanism 230 can be implemented on any underlying hardware, such as a network, the Internet, a bus 224, a combination thereof, etc.

In some embodiments, the components 202, 204, 206, 208, 210, 212, 214, and/or 216 of the verification engine 104 are coupled, via the processor 220, for electronic communication with one another and the memory 222, the communication unit 226, and/or the verification data store 106. In some embodiments, these components may provide data directly to one another. In other embodiments, these components 202, 204, 206, 208, 210, 212, 214, and/or 216 may store data in the memory 222 and/or verification data store 106 for access and retrieval by the other components 202, 204, 206, 208, 210, 212, 214, and/or 216. For example, any of the components 202, 204, 206, 208, 210, 212, 214, and/or 216 may communicate with the memory 222 and/or the verification data store 106 to store and access data. In another example, one or more of the components 202, 204, 206, 208, 210, 212, 214, and/or 216 may be stored and operable on disparate computing devices distributed over the network 101 and may communicate and exchange data via the network 101.

The verification engine 104 and its respective sub-components 202, 204, 206, 208, 210, 212, 214, and 216 may be sets of instructions stored in the memory 222 and executable by the processor 220 for communication with the other components of the verification server 102; may be implemented via one or more application specific integrated circuits (ASICs) coupled to the bus 224 for cooperation and communication with the other components of the server 102; sets of instructions stored in one or more discrete memory devices (e.g., a PROM, FPROM, ROM) that are coupled to the bus 224 for cooperation and communication with the other components of the server 102; a combination thereof; etc. In some implementations, one or more components of the verification engine 104, the acquisition module 202, the categorization module 204, the attribute generator 206, the pre-processor 208, the challenge generator 210, the response analyzer 212, the learning module 214, and the API module 216 are sets of instructions executable by the processor 220 to provide their functionality. In other implementations, one or more of these components 104, 202, 204, 206, 208, 210, 212, 214, and 216 are stored in the memory 222 of the server 102 and are accessible and executable by the processor 220 to provide their functionality. In any of the foregoing implementations, these components 104, 202, 204, 206, 208, 210, 212, 214, and 216 may be adapted for cooperation and communication with the processor 220 and other components of the server 102.

It should be understood that the embodiment depicted in FIG. 2B is provided by way of example and that other configurations for the verification engine 104 are possible and contemplated. For example, some or all of the components 202, 204, 206, 208, 210, 212, 214, and 216 of the verification engine 104 may be combined or segmented into further components. Additionally, the verification engine 104, or aspects thereof, may be integrated into other software, such as the application engine 136 or applications operated by the application server 134, the search server 128, or the image server 120.

The acquisition module 202 is software, code, logic, or routines for acquiring image-related information. In some embodiments, the acquisition module 202 is an aggregator that aggregates image-related information from one or more information sources coupled to the network 101. An information source may be a computing and/or storage device capable of storing and providing access to information including image data. The image-related information aggregated from the information sources by the acquisition module 202 may include electronic references to images, information describing the images and the objects depicted by the images, instances of the images themselves, etc. In some embodiments, the image-related information may include category information for the images. For example, the images may depict various objects which are categorized into various categories, and the acquisition module 202 may aggregate the images as well as category information for those images. Images aggregated by the acquisition module 202 that have been previously categorized are also referred to herein as pre-categorized images. The images aggregated by the acquisition module 202 may have any format, including, for example, raster formats, vector formats, compound formats, stereo formats, or the like. As a further example, the images may be Joint Photographic Experts Group (JPEG) images, Tagged Image File Format images (TIFF), raw images, Portable Network Graphics (PNG) images, Graphics Interchange Format (GIF) images, bitmap images, Scalable Vector Graphics (SVG) graphics, Portable Document Format (PDF) graphics, etc.

In some embodiments, the image-related information aggregated by the acquisition module 202 from the one or more information sources may include attributes for the images being aggregated. An attribute may describe a quality or property of an image or the objects depicted by the image. For example, an attribute may describe the image's resolution, color depth, creation date, exposure information, camera or lens information, format, distortion value, etc.; an object's size, shape, weight, cost, price, age, texture, color, sheen, structure, configuration, material; an overall perception or look and feel of the image or object(s) depicted thereby, or the like. An attribute may have an associated attribute value to quantify the attribute.

The acquisition module 202 may aggregate local information sources or information sources distributed across a network (e.g., network 101). The acquisition module 202 may store the image-related information aggregated by it in the verification data store 106 for access and retrieval by the other components 204, 206, 208, 210, 212, 214, and 216 of verification engine 104, or may provide it directly to one or more of these components 204, 206, 208, 210, 212, 214, and 216. For example, the acquisition module 202 may store a collection of records in the verification data store 106 which include the images, attributes, and category information. In some embodiments, the acquisition module 202 may fetch images from unaffiliated websites (e.g., via URIs) so they may be served by the verification engine 104 in association with a challenge. This is advantageous because it makes it difficult for an agent attempting to circumvent the challenge to backtrack the images to their original sources (e.g., URIs).

The categorization module 204 is software, code, logic, or routines for categorizing images. In some embodiments, the categorization module 204 interacts with the acquisition module 202 to categorize images once they have been aggregated by the acquisition module 202. For example, the acquisition module 202 may send images to the categorization module 204 along with any descriptive information associated with those images, such as metadata, attributes, category information etc., and the categorization module 204 may categorize the images by storing them in the verification data store 106 according to various categories. In another example, the categorization module 204 may retrieve the aggregated information from the verification data store 106 to categorize it.

The categorization module 204 may categorize an image into more than one category. In some embodiments, the categorization module 204 may use a taxonomy/ontological classification scheme to categorize an image. For example, an image may be classified into ordered categories, such as a series of categories of increasing precision. By way of illustration, an image may depict a Philips screwdriver, and the categorization module 204 may categorize the image into the following series of categories: hardware>tools>hand tools>screw drivers>Philips-head screw drivers where the hardware category in this example may be interchangeably referred to herein as the main category or the general category, and its subsequent categories as subcategories or more precise categories. The categorization module 204 may categorize an image using multiple classification schemes/hierarchies, which may be loosely related. For example, the categorization module 204 may categorize an image depicting running shoes as sporting equipment and clothing, which may be categories respectively belonging to different or loosely related classification schemes/hierarchies.

To categorize an image, the categorization module 204 may store the image in association with a category, series of categories, two or more unrelated or loosely related categories, taxonomy, etc. For example, the categorization module 204 may store the image in the verification data store 106 along with data describing the category, series of categories, etc. that the image belongs to. The categorization module 204 may also store other information related to the image, such as attribute information, in the verification data store 106. In some embodiments, not category information may be available for an image, and the categorization module 204 may store the image in the verification data store 106 as uncategorized. In other embodiments, an image may only have weak or unreliable category information associated with it, and the categorization module 204 may unofficially/weakly categorize the image. In these latter embodiments, the image may be regarded as not categorized until stronger evidence has been gathered, as discussed in further detail below with regard to the learning module 214 and FIGS. 3-5D, for example.

The attribute generator 206 is software, code, logic, or routines for determining attributes for the images. As described above, an attribute may describe a quality of an image or the objects depicted by the image. For a given image, the attribute generator 206 may use any available attribute information, as aggregated by the acquisition module 202, and/or the image data of the image to determine attributes and corresponding attribute values for the image.

In some embodiments, the attribute generator 206 may determine a profile attribute and value for each image stored in the verification data store 106 based on the image data of the image. The profile value may reflect an overall perception or quality of the image. The profile value may be based one or more of a property of the object depicted by the image, a category of the image, and/or the image's lighting, balance, tone, contrast, brightness, colors, exposure, quality, resolution, sharpness, etc., or other similar attributes. The profile values of the images may be used to compare the images to one another to determine which images are easily detectable as similar or different in nature.

In some embodiments, the attribute generator 206 cooperates with the acquisition module 202 and/or the categorization module 204 to determine attribute for the images as they are aggregated and/or categorized by the acquisition module 202 and categorization module 204, respectively. The attribute generator 206 may receive image-related information directly from the acquisition module 202 and/or the categorization module 204, or may retrieve the image-related information from the verification data store 106 or the other entities of the system 100.

The pre-processor 208 is software, code, logic, or routines for processing images for obscurity. In some embodiments, the pre-processor 208 manipulates the image data of an image to make the contents of image more difficult for a software application to process and determine the objects it depicts without rendering the image unrecognizable to a human user. For example, the pre-processor 208 can process the image to the extent that it cannot be used to recover the image using the functionality of a search engine (e.g., 130). In this example, the search engine 130 may accept an image as a search input and may be able to identify images on the network 101 that are the same or substantially similar to the input image (e.g., that depict the same or substantially similar objects as the input image). Pre-processing the images can prevent an agent, such as an Internet bot or a web crawler, from being able to use them in cooperation with the search engine 130 to reliably retrieve unprocessed instances of images and/or information characterizing the objects in those images. Thus, pre-processing the images can reduce the probability of the agent automatically determining the contents of an image and using this determination to successfully complete a challenge, as described in further detail below. When obscuring an image, the pre-process may create a duplicate instance of the original image, and then manipulate the underlying data of the image to homogenize it, thus rendering its contents less recognizable to a software application attempting to reverse process the image. For instance, to obscure an image, the pre-processor 208 may resample, reformat, resize, blur, filter, pixelate, de-saturate, or otherwise process the data.

The pre-processor 208 may pre-process an image once it has been aggregated by the acquisition module 202, categorized by the categorization module 204, or after attributes for the image have been determined by the attribute generator 206. In some embodiments, the pre-processor 208 receives the image directly from the acquisition module 202, the categorization module 204, and/or the attribute generator 206. In other embodiments, the pre-processor 208 retrieves the image from the verification data store 106.

The challenge generator 210 is software, code, logic, or routines for receiving a challenge request and generating and sending a challenge. In some embodiments, the challenge generator 210 is coupled to the network 101 via the communication unit 226 to receive a challenge request. In some embodiments, the challenge request may be generated by and received from a user device 112. In other embodiments, the challenge request may be generated by and received from the application server 134. In yet other embodiments, no challenge request is received, and the verification engine 104 programmatically generates and sends a challenge.

In some embodiments, responsive to receiving a challenge request, the challenge generator 210 may parse the request for information identifying the user 116 and the user's location. For example, the challenge request may include location information for the user 116, such as an IP address, positioning system coordinates, etc., and the challenge generator 210 may use the location information to formulate the challenge. In some embodiments, the challenge generator 210 is capable of determining the location/approximate location of a user device 112 using an IP address of a user device 112 by cross-referencing the IP address with other information sources, such as internet server provider databases, internet registries, etc., coupled to the network 101. In other embodiments, the challenge generator 210 can interact with a geolocation engine operable by a third-party server (not shown) coupled to the network 101 to process signal information transmitted between the user device 112 and a plurality of transmission nodes of the mobile network using multilateration or triangulation to determine the geographic location of a user device 112.

In some embodiments, the challenge generated by the challenge generator 210 may be a challenge for the user 116 to distinguish between images included in the challenge based on a particular property associated with one or more of the images. By way of example, the property may be a category or categories the images belong to, or in some instances, objects depicted by images, attributes attributable to the objects of the images, or the like. For instance, the challenge generator 210 may select a first set of images that depict objects that are generally different in some quantifiable way but share a similar property; select one or more second images depicting objects that do not share the similar property with the first set of images (i.e., that are different in some quantifiable way from the first set of objects based on the property); and may include an instruction for the user 116 to select, based on the property, the one or more images that are different in some quantifiable way, or the set of images that are the similar in some quantifiable way.

In an embodiment where the property which distinguishes the images included in the challenge is a category the images belong to, the challenge generator 210 selects two or more first images from a first image category and one or more second images from one or more second image categories. The first image category and the one or more second image categories can be determined by the challenge generator 210 at random or based on their relationship to one another. For example, the verification data store 106 may store a taxonomy describing how strongly various categories are related to one another, if at all, and the challenge generator 210 may select images from the first image categories and the one or more second categories based on the taxonomy. Categorization of images is discussed further above with reference to FIG. 1 and below with reference to FIGS. 5A-D, for example. In an example embodiment where the challenge being generated instructs the user to select the images that do not belong to the first image category, the number of first images selected exceeds the number of second images selected. However, it should be understood that many different variations of challenges are contemplated, and any number of images may be selected for inclusion in the challenge by the challenge generator 210 and the mix between images selected from the first image category and the one or more second image categories can vary depending on the purpose of the challenge.

When selecting the images to be included in a challenge, the challenge generator 210 may also include the attributes for those images, as generated by the attribute generator 206 or determined by the acquisition module 202. For example, the challenge generator 210 may select the images based on a description of what they depict, profile values, metadata, or of the other attributes discussed above, for example, with reference to the acquisition module 202 or the attribute generator 206.

Selecting the images based on attributes is advantageous as it can further frustrate the processing of the images by a software program that is posing as a human/operating as proxy for a human. For instance, the challenge can include an image that is different from other images in the challenge (e.g., an image of a spatula versus images of a wrench, screwdriver, and hammer, etc.) based on an attribute or category that is not easily discernible by a sophisticated agent, such as an Internet bot; can include images to be ranked based on an attribute that is not easily discernible by the agent (e.g., the weight of the objects depicted by the images, the relative sizes of the objects depicted by the images, the price of the objects depicted by the images, etc.); or the like.

In some embodiments, the challenge generator 210 may select images from one or more categories that have widely disparate attribute values (e.g., profile values, weight values, price values, size values, etc.), which can result in the selection of images that depict objects that a human can discern as belonging various categories, but that appear unrelated from a data analysis perspective. This can make it highly improbable for an agent, such as a software program, to deduce, based on an analysis of these images that these images belong to the same category. In other embodiments, the challenge generator 210 may select images from two or more image categories which all have substantially similar or the same attribute values (e.g., profile values), which results in the selection of images that a human can discern as belonging to different categories, but which appear to all be substantially similar to a software program (e.g., Internet bot) analyzing the images. Beneficially, this can greatly reduce the probability of the software program circumventing the challenge by emulating human behavior and correctly answering the challenge.

The challenge generator 210 can, in some embodiments, generate a challenge based on attributes of the objects depicted by the images. To do so, the challenge generator 210 may select, using a certain attribute, two or more first images having certain attribute values for that attribute. The predetermined attributes values can respectively reflect qualities of the objects depicted by the images. In some embodiments, the attribute values may be pre-determined by the attribute generator 206. For example, the challenge could include two or more images depicting objects having a certain attribute and values for that attribute, and a challenge parameter instructing the user 116 to select or sort the images in a particular order based on that the values the user 116 perceives the objects to have for that attribute. The attribute may, for instance, be the size or weight of the objects depicted by the images, and the challenge parameter may instruct the user 116 to select or sort the images in order of increasing size or weight. In a further example, the challenge could include images of a bottle of shampoo, a 5-gallon bucket of water, a horse, and a house (all of which have an associated size attribute/value), as well as an instruction for the user 116 to select the images in order of increasing size. Another example may include generating a challenge having images depicting various products (e.g., a loaf of bread, a gallon of milk, a half-gallon of premium ice cream, and a whole ham, etc.) and asking the user 116 to order the products by price. In this example, the challenge generator 210 could retrieve a current price for those items from a server hosting an online marketplace, or the acquisition module 202 could refresh the image records stored in the verification data store 106 with updated pricing information at regular intervals based on the information it aggregates.

In yet another example, the challenge may be generated to include two or more first images whose values for a particular attribute are similar or the same, and one or more second images whose values for that attribute differ significantly from those of the first images. The first images may, for instance, depict objects that are substantially similar or same in size, weight, or price, etc.; second image(s) may depict an object(s) that is/are substantially different in size, weight, or price, etc. from the first images; and the challenge may instruct the user 116 to identify which of the images are the most different in size, weight, or price, etc. It should be understood that the attributes used by the challenge generator 210 for image selection may reflect any quality or property of the objects depicted by the images.

A challenge generated by challenge generator 210 may also include one or more undetermined images, such as an uncategorized image, or an image that has an undetermined attribute. In addition to its conventional meaning, the term uncategorized can also include images that may be weakly categorized or unofficially categorized into one or more categories, as discussed elsewhere herein. Likewise, the phrase undetermined attribute, in additional to its conventional meaning, may include an attribute for which a quantity/value has been weakly or unofficially determined. The verification data store 106 may store data indicating what attributes have been determined for a given image, to what level an image has been categorized (not at all, weakly, unofficially), to what level an attribute/value has been determined (not at all, weakly, unofficially), or the like, and the challenge generator 210 may query the verification data store 106 for the one more images that are uncategorized or have a particular attribute value that has not yet been determined for it (e.g., by the attribute generator 206).

Including one or more uncategorized images, or one or more images for which an attribute has not yet been determined, in a challenge is advantageous as it can leverage input provided by the user 116 to categorize the image(s) or determine an attribute and a corresponding attribute value for the image(s). For example, the challenge generator 210 may generate and send a challenge for display to a user 116 which includes three images selected from a first image category, one image selected from a second image category that is distinct from the first image category, an uncategorized image, and an challenge parameter instructing the user 116 to select the image(s) that does/do not belong to the first image category. If the user 116 provides input selecting the uncategorized image as not belonging to the first image category, evidence that the uncategorized image does not belong to the first image category can be stored by the response analyzer 212 in the verification data store 106 in association with the uncategorized image. However, if the user 116 provides input associating the image with the first category, which in this example, would be not selecting image, evidence associating the uncategorized image with the first image category may be stored by the response analyzer 212 in the verification data store 106 in association with the uncategorized image. The learning module 214, in cooperation with the categorization module 204, may the use this evidence to categorize the uncategorized image into an applicable category. Additional examples of leveraging the user input provided in a challenge response to determine an image category or attribute for an image are provided below with reference to the learning module 214, and FIGS. 5A-6, for example.

To send the challenge, the challenge generator 210 may, in some embodiments, cooperate with the application engine 136. For example, the challenge generator 210 may transmit the challenge to the application engine 136, and the application engine 136 may forward it to the user device 112 for presentation to the user 116. In yet other embodiments, the challenge generator 210 may transmit the challenge directly to the user device 112 via the network 101. Other configurations are also contemplated and fall within the scope of this disclosure.

In response to receiving the challenge, the user application 114 operating on the user device 112 may present the challenge to a user 116 via one or more user interfaces. Various example interfaces are described below with reference to at least FIGS. 7-8. The challenge sent by the challenge generator 210 may include presentational information and the user application 114 may use the presentational information to form the look and feel of the user interfaces. For example, the electronic file(s) or data stream(s) may be formatted using a markup language (e.g., HTML, XML, etc.), style sheets (e.g., CSS, XSL, etc.), graphics, and/or scripts (e.g., JavaScript, ActionScript, etc.), and the user application 114 may interpret the interface instructions and render an interactive Web User Interface (WUI) for display on a user device 112 based thereon. In other embodiments, the user application 114 may determine the formatting and look and feel of the user interfaces independently, or the presentation information may be provided by the application engine 136. Using the user interfaces presented by the user application 114, the user 116 can input commands to complete the challenge, as discussed in further detail below.

The response analyzer 212 is software, code, logic, or routines for determining a result of a challenge based on a challenge response. In some embodiments, the challenge response may include user input, such as a user selection, and the response analyzer 212 may compare this user input to a challenge parameter used by the challenge generator 210 to generate the challenge to determine if the user 116 successfully completed the challenge. For instance, the response analyzer 212 can determine the result of the challenge to be successful if the challenge parameter of the challenge is satisfied by user input included in the challenge response, and unsuccessful if it is not.

In some embodiments, the response analyzer 212 may determine a result for the challenge by interpreting the user input to identify which, if any, of the images the user 116 selected or sorted, and then assessing whether the image or images selected by the user 116 (if any) satisfies the challenge parameter. In some embodiments, none of the images may meet the requirements of the challenge and a non-selection can satisfy the challenge parameter. In other embodiments, the challenge parameter may require the user 116 to sort images into corresponding categories, indicate which image or images do not belong to a particular category, rank the images in a particular order based on an attribute, etc., and the response analyzer 212 may identify how the images were interacted with in the challenge response and compare it to the challenge parameter to determine whether the challenge was completed successfully.

Additional examples, variations, structure, and functionality of the response analyzer 212 are discussed with reference to FIGS. 5-6, for example.

The learning module 214 is software, code, logic, or routines for determining an undetermined property for an image based on a challenge response. In some embodiments, the response analyzer 212 signals the learning module 214 to perform this determination. For example, the challenge response may contain data that can be used for determining a previously un-established image property, such as an image category or an attribute, and the response analyzer 212, upon detecting this information, may signal the learning module 214 to process it. In other embodiments, another module, such as a controller module (not shown), may signal the learning module 214 or the learning module 214 can perform this functionality independently.

The property determination performed by the learning module 214 can include categorizing an uncategorized image or determining an undetermined attribute for an image. In some embodiments, the property determined by the learning module 214 can reflect an actual, factual property associated with the object depicted by the image, such as an object's relative weight, size, etc., as discussed elsewhere herein. In other embodiments, the property determined by the learning module 214 can reflect a user's perception about the object depicted by the image. For example, in response to challenging to the user to rank an uncategorized image by price/value, the learning module 214 may deduce how much the object depicted by the image is worth or should cost. As a further example, a challenge could include images of a paper-back book and hard-cover book, and the learning module 214 could determine, based on the challenge response, whether the user perceives the paper-back or hard-cover book to be worth more. This is advantageous as the user perception information determined by the learning module 214 can be used by retail services to market products based on their customer's actual perceptions of those products.

A threshold may govern how the learning module 214 performs the categorizing or attribute determination. For example, the threshold may request a certain amount of evidence be collected justifying the category or attribute, before the learning module 214 can categorize or determine the attribute for the image. The threshold may require a certain number of challenge responses associating an image with a particular category or establish a value for a particular attribute. The threshold may also require that any supportive evidence outweigh contradictory evidence by a certain amount before the learning module 214 can categorize or determine the attribute for the image.

By way of example, a particular uncategorized image may have been included in series of challenges sent to various users over a period of time. The challenge responses received in reply to those challenges may have associated the uncategorized image with a "hardware> . . . >tools>hand tools" category six times and a "home>furniture> . . . >bar stools" category once. The threshold may require that the uncategorized image be associated with the same category at least six times with no more than one conflict association before the image can be formally categorized into that category. In this example, since the threshold has been satisfied, the learning module 214 categorizes the image into the image category, for example, by updating a record stored in the verification data store 106 for that image.

In some embodiments, the learning module 214 stores, in the verification data store 106, user input provided to associate an image with a particular category or establish a value for a particular attribute, regardless of whether it is contradictory with other evidence that has been stored for that image, and can use this information going forward to make a formal determination. For instance, in an embodiment where the challenge response positively associates an uncategorized image with a particular image category, the learning module 214 may use the following example threshold algorithm to categorize it. In this example, a positive association is evidence for the item belonging to a particular category, and in every more general related category. For example, if the particular category is "hand tools," than the more general related categories may be "hardware>tools." The positive association is also evidence against any unrelated categories (e.g., "kitchen utensils") but may be neutral for more precise categories (e.g., "screwdrivers").

More specifically, a positive association of an image with a particular category can increment an evidence counter for that image and category by 1. However, for the categories that are neither more general nor more precise relative to that category, the evidence counters for that image and those categories can be reduced by 0.5. Further, a negative association of an image with a particular category can reduce the evidence counter for that image and category by 0.5. However, for all other categories the evidence counters for that image and those categories can be incremented by 0.1.

Once an evidence counter for an image and a category reaches a pre-determined threshold value (e.g., >100), then the learning module 214 may categorize the image. In some embodiments, to reduce the effect of possible false negative or positive associations, a limited number of conflicting associations may be allowed without affecting the evidence counter. It should be understood that the incrementing and reduction values described above are provided by way of example, and other values may be used. Moreover, like all embodiments discussed herein, the above embodiments are provided by way of illustration and other techniques drawn from areas such as machine learning and statistics may be used by the learning module 214 to determine an undetermined property for an image based on a challenge response.

Additional examples, variations, structure, and functionality of the learning module 214 are discussed below with reference to FIGS. 4-5D, for example.

The API module 216 is software, code, logic, or routines for interfacing with and providing the functionality of the verification engine 104 to an external software application, such as the application engine 136 or the user application 114. In some embodiments, the API module 216 relays requests and responses from the external software application to the appropriate components of the verification engine 104 for processing. For example, in an implementation where the application engine 136 and the verification engine 104 resides on distinct servers coupled via the network 101, the application engine 136 may interface with the verification engine 104 via the API module 216. The API module 216 may be electronically communicatively coupled to the other components of the verification engine 104 to relay information. For example, the API module 216 can receive a challenge request, via the network 101 and the communication unit 226, from an external software application, signal the challenge generator 210 to generate a challenge based thereon, receive the challenge from the challenge generator 210, and relay the challenge to the software application. The API module 216 may also provide access to data stored in the verification data store 106 to the external software application. In some embodiments, the API module 216 may require the external software application to authenticate using a standard authentication protocol to utilize its functionality.

Example Methods

Figure 3:
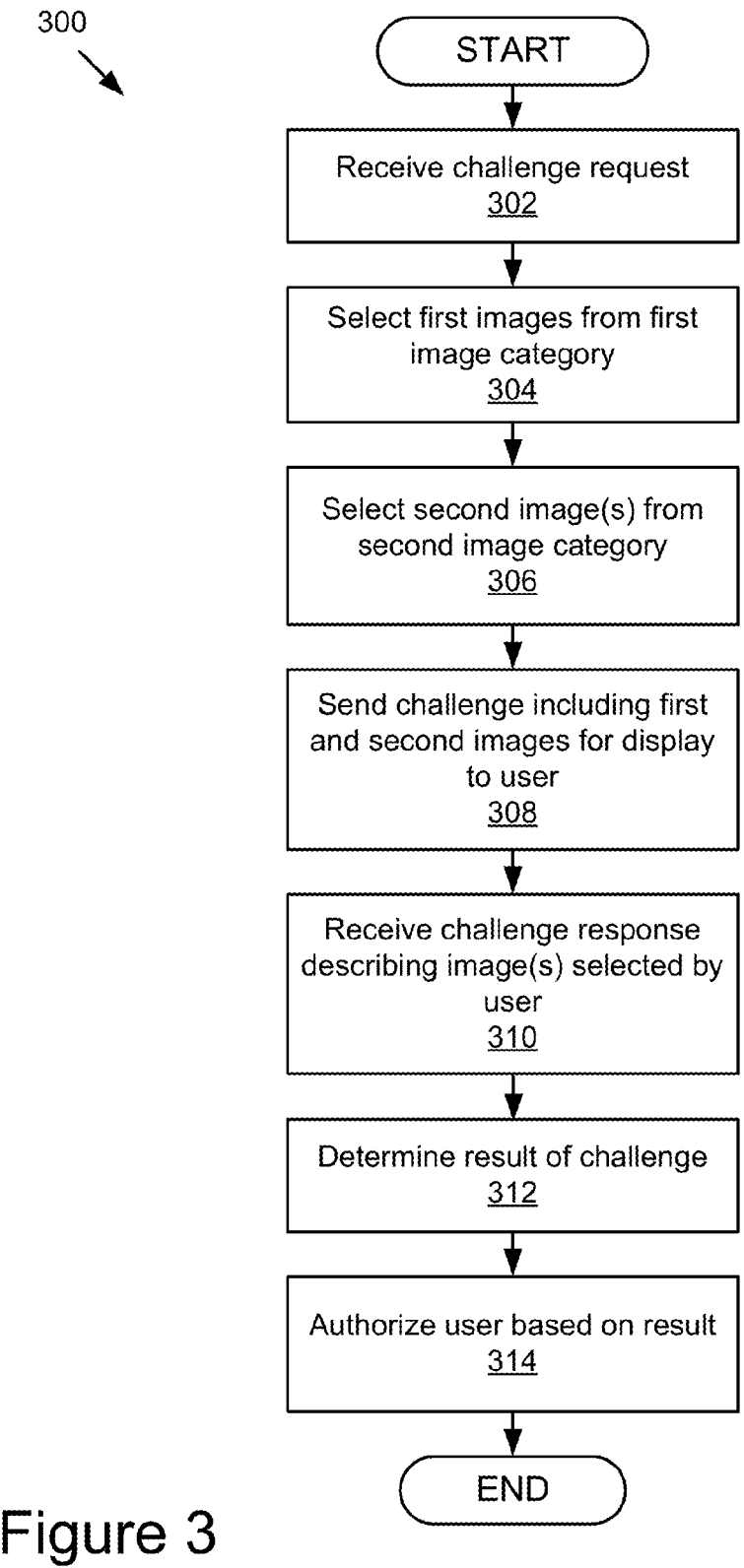
FIG. 3 is a flowchart of an example method for challenging a user seeking access to a software service.

Referring now to FIGS. 3-6, various example methods are described. In particular, FIG. 3 is a flowchart of an example method for challenging a user 116 seeking access to a software service. In the depicted embodiment, the method 300 begins by receiving 302 a challenge request to verify a person is operating a user device 112. The challenge request may be received from a client device, such as a user device 112, the application server 134, or any another computing device coupled to the network 101. In some embodiments, the verification engine 104 receives the challenge request from the application engine 136 of the application server 134. For example, a person/the user 116 of the user device 112 may request access to a service operated by the application server 134, and to verify that the person/user 116 is actually operating the user device 112, application engine 136 may generate and send a challenge request to the verification engine 104a or 104b. In other embodiments, the verification engine 104 may receive the challenge request directly via the network 101 from a user application 114 operating on a user device 112.

The method 300 may also begin automatically. For example, a batch process performing the operations of the method 300 may be executed at various intervals (e.g., every few minutes, hourly, daily, weekly etc.) and the method 300 may begin by performing the operations of block 304.

The method 300 continues by selecting 304 two or more first images from a first image category and selecting 306 one or more second images from one or more second image categories. In some embodiments, the verification engine 104 maintains a collection of image records containing graphical images classified into categories, such as the first and second image categories, based on the objects depicted by the images, as discussed in further detail above.

The method 300 then generates and sends 308 a challenge including the first and second images to a user device 112 for presentation to a user 116 (e.g., the person). In some embodiments, the challenge may be generated by the challenge generator 210 of the verification engine 104. The challenge may be generated to include a challenge parameter, such as an instruction describing an action for the user 116 to perform in association with the first and second images. For example, the challenge includes an instruction for the user 116 to select the images which belong, or do not belong, to a particular category. In further examples, the challenge may include an instruction for the user 116 to select all of the images which belong to the first image category, or select the image(s) which do not belong to the first image category. To send the challenge, the verification engine 104 may send the challenge to the application engine 136 of the application server 134 for transmission via the network 101 to the user device 112 of the user 116, may transmit the challenge directly to the user device 112 of the user 116 via the network 101, or the like.

The method 300 then receives 310 a challenge response from the user device 112 of the user 116. In some embodiments, the challenge response may describe the action performed by the user 116 in association with the images included in the challenge, such as a user selection of at least one image from among the two or more first images and the one or more second images. For example, the challenge response may include data describing which image(s) were selected/not-selected by the user 116. In some embodiments, the response analyzer 212 of the verification engine 104 may receive the challenge response. For instance, the response analyzer 212 may receive the challenge response from the application engine 136 of the application server 134, from the user device 112, or from another computing device coupled to the network 101.

Next, the method determines 312 the result of the challenge. The result of the challenge can be determined to be successful if the challenge parameter of the challenge is satisfied by the challenge response, and unsuccessful if it wasn't. In some embodiments, the verification engine 104 can compare the challenge response to the challenge to make this determination. For example, if the challenge includes an instruction for the user 116 to perform a particular action in association with the images included in the challenge, the response analyzer 212 can analyze user input/selection included in the challenge response to determine whether or not the user performed the action as instructed. As a further example, if the challenge included an instruction for the user 116 to identify the image(s) that do not belong to the first image category, the response analyzer 212 analyzes the challenge response to determine image(s) that were selected by the user 116 and whether selected image(s) belong to the first image category. In this example, if the selected image(s) do belong to the first category, then the response analyzer 212 determines that the challenge is not been satisfied. However, if the selected image(s) do not, the response analyzer 212 determines that the challenge has been satisfied.

In block 314, the method 300 provides authorization for the user device 112 to access a software service based on the results determined in block 312. For example, the method 300 may authorize the user if the result of the challenge is determined to be successful in block 312. In some embodiments, to authorize the user, the response analyzer 212 sends a confirmation signal to the application engine 136 or the user application 114 confirming that the challenge has been satisfied. The method 300 is then complete and ends.

Figure 4A:
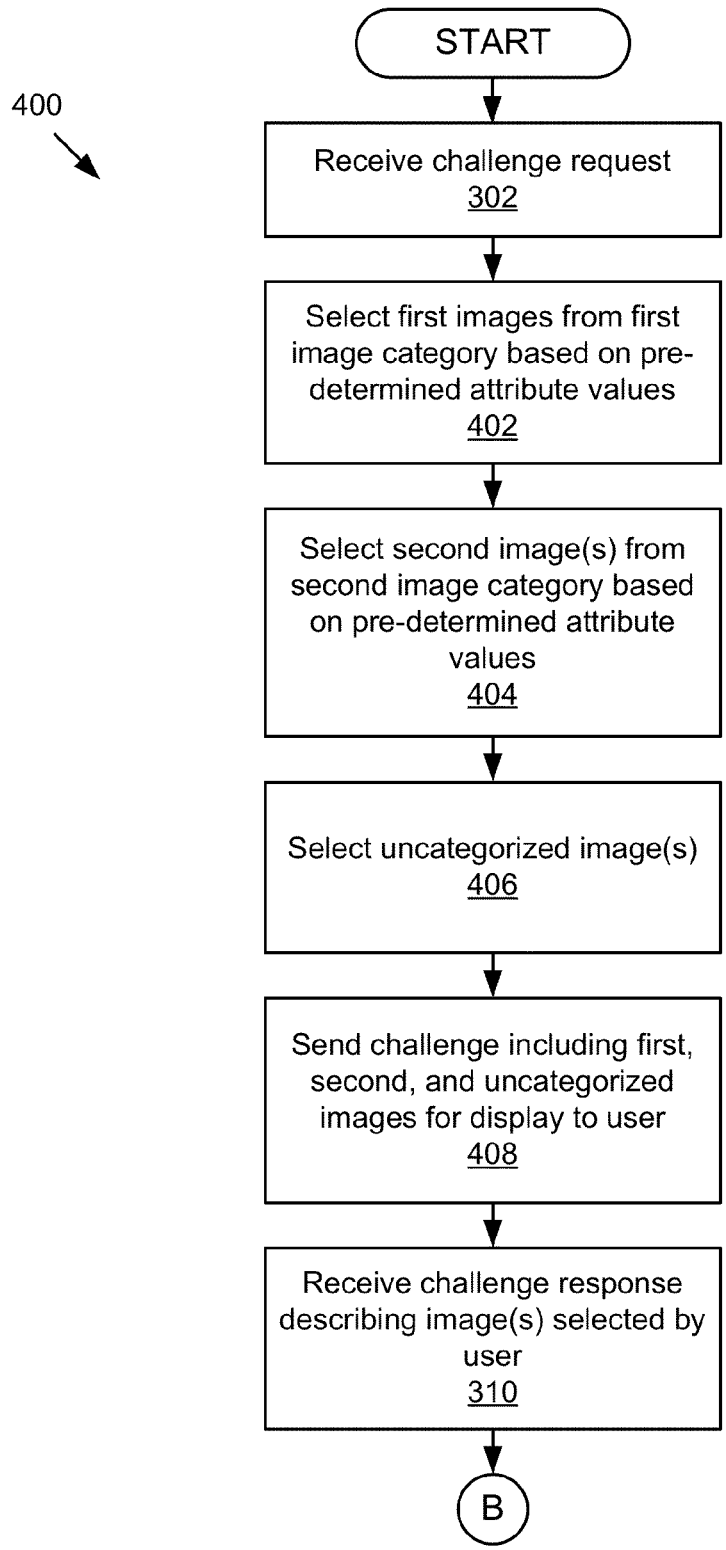
FIGS. 4A-B are flowcharts of an example method for challenging a user seeking access to a software service.
Figure 4B:
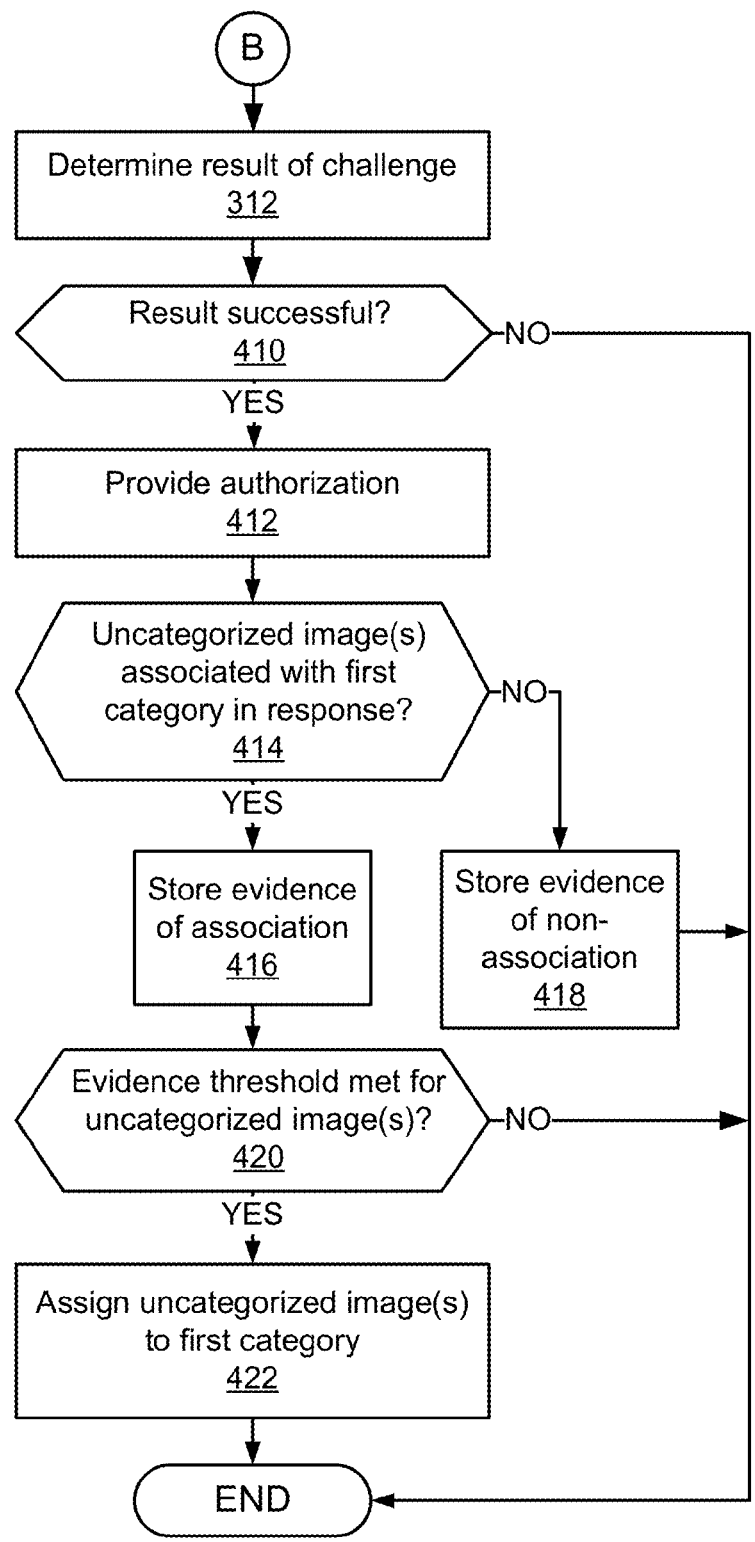
Figure 5A:
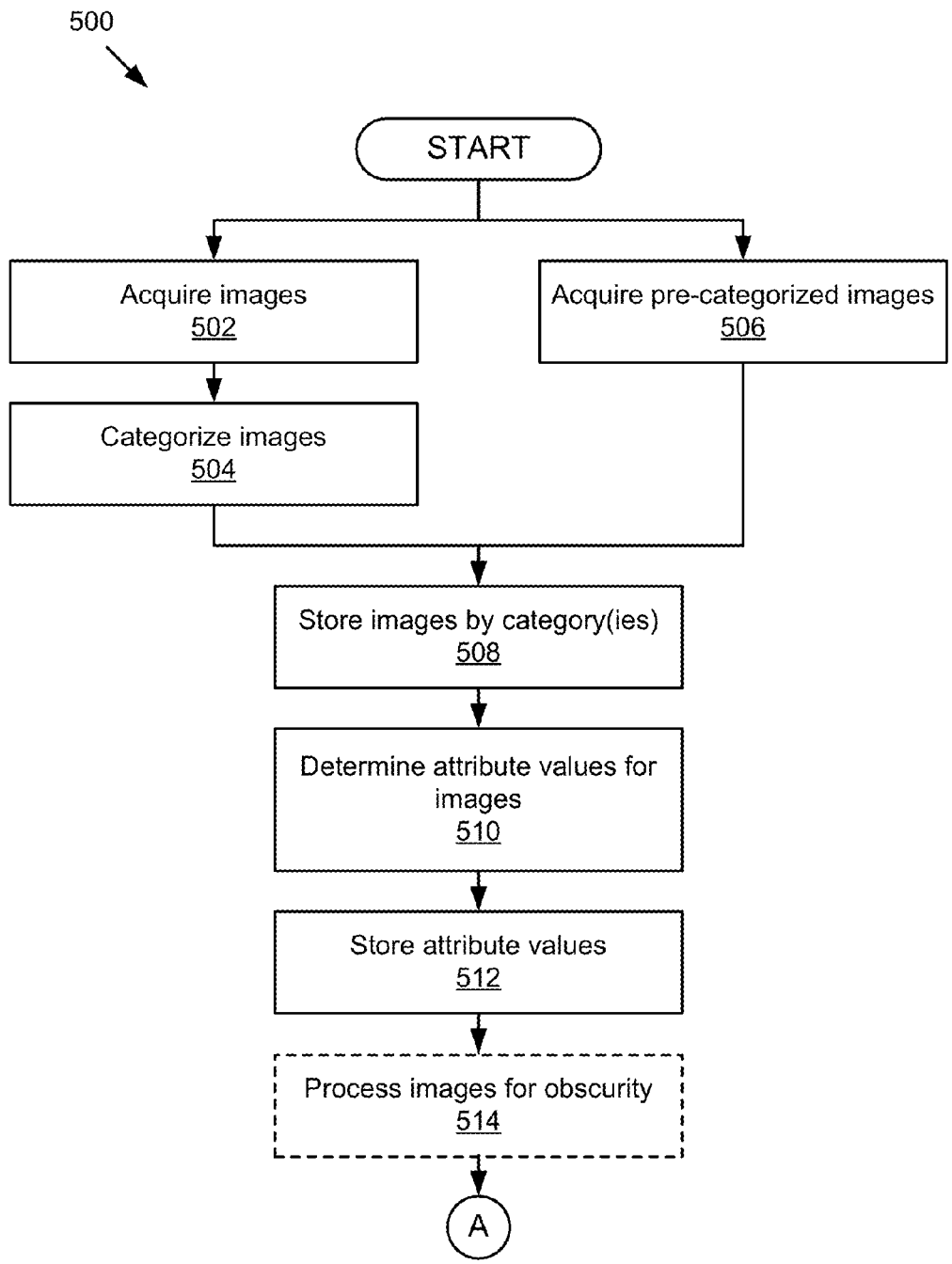
FIGS. 5A-D are flowcharts of an example method for challenging a user seeking access to a software service.
Figure 5B:
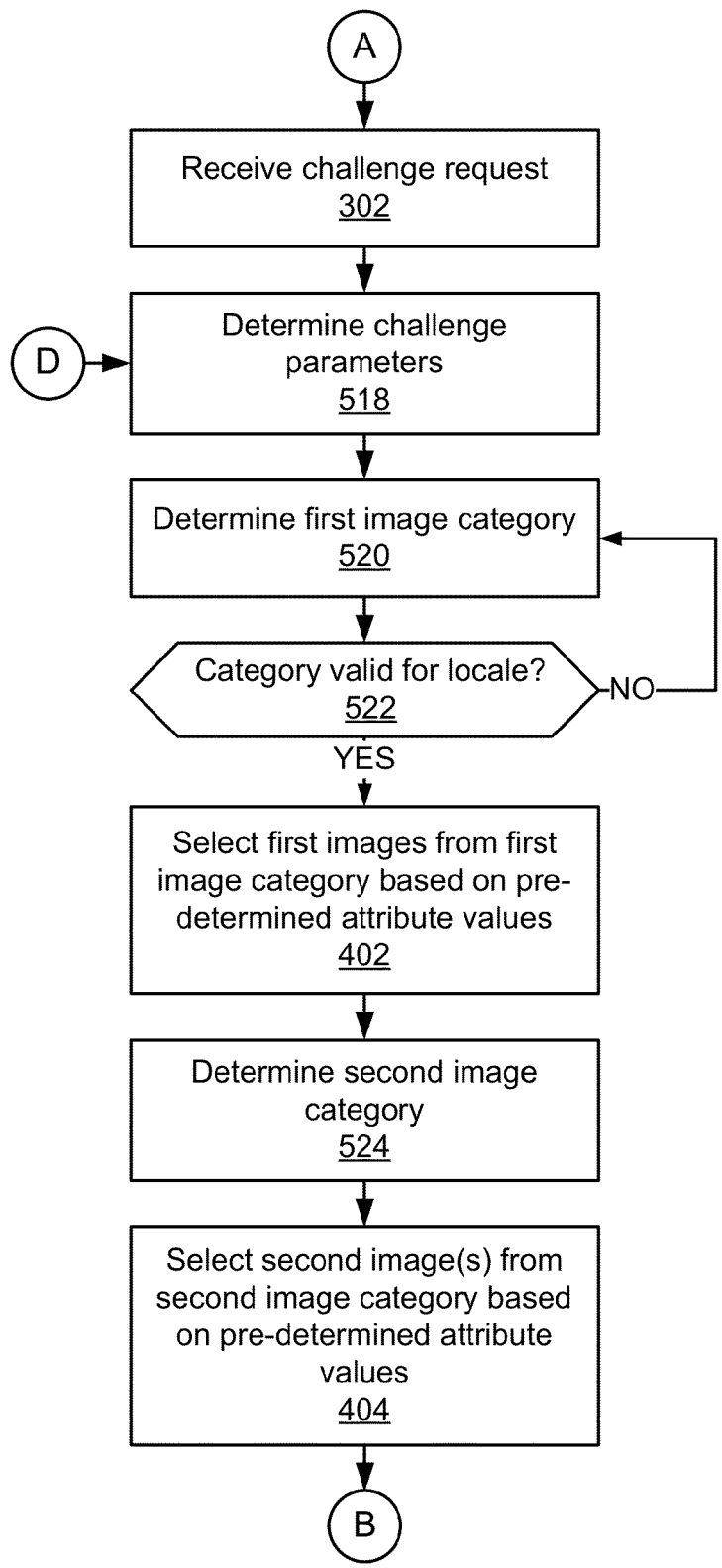
Figure 5C:
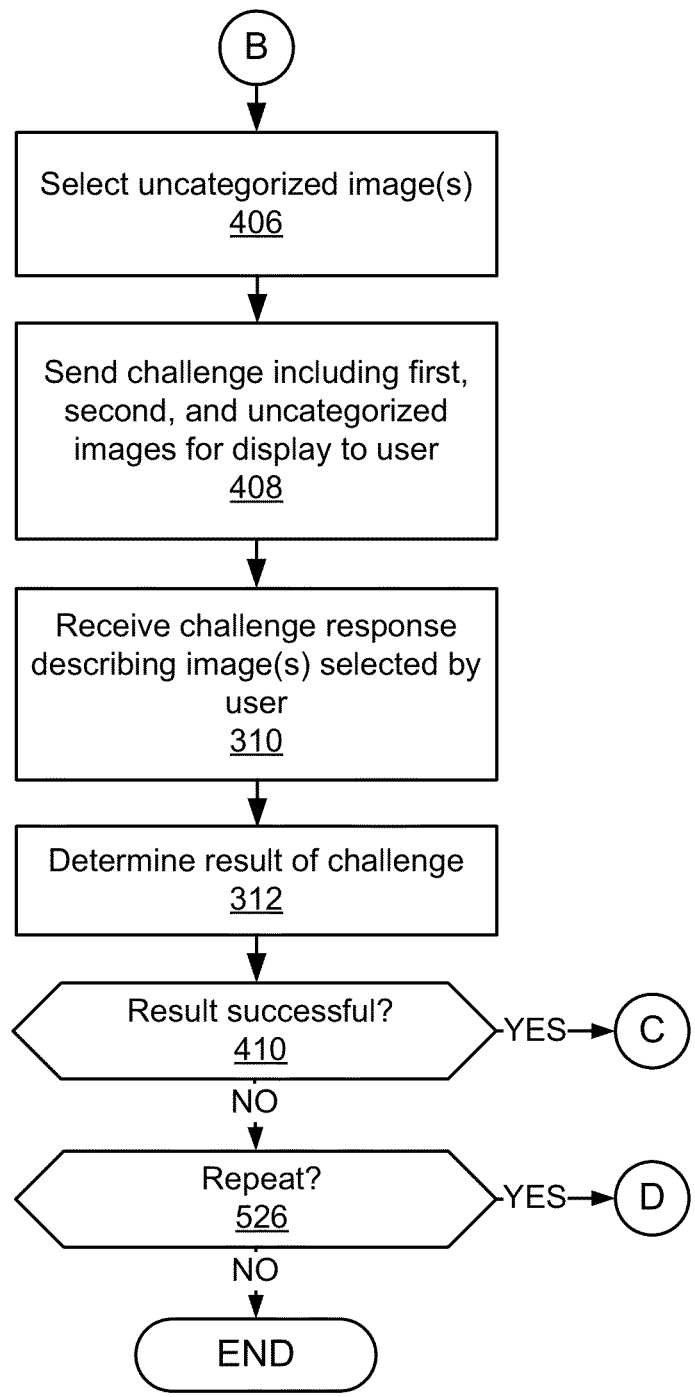
Figure 5D:
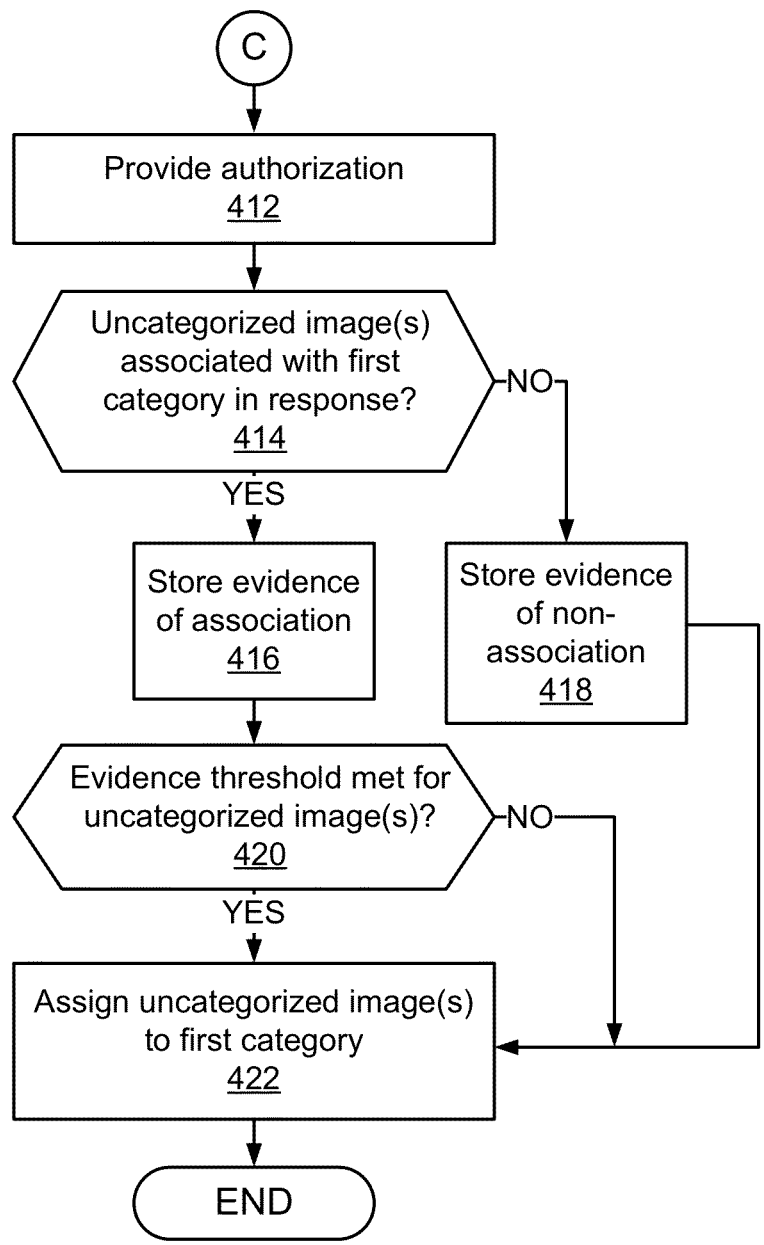

FIGS. 4A-B are flowcharts of an example method 400 for challenging a user seeking access to a software service. As illustrated in FIGS. 4A-B, the method 400 includes blocks similar to or the same as those described above for the method 300. For convenience and ease of understanding, those blocks have the same reference numerals and perform the same or similar functions, and their description is incorporated by internal reference as indicated.

The method 400 begins by receiving 302 a challenge request, as described above with reference to FIG. 3, and then continues by selecting 402 two or more first images from the first image category based on attribute values pre-determined for those images. The attribute values may be pre-determined to reflect various qualities of the objects depicted by the images, and the method 400 may use these pre-determined attribute values to select images from the first category that are distinctive. This is advantageous because it can reduce the probability of an agent, such as a robotic software application like an Internet bot or a web crawler, determining which images belong to the first category based on their visual similarity, while still allowing a human user easily determine the images that belong to the first category.

The method 400 then selects 404 one or more second images from the second image category based on attribute values pre-determined for those images. As described previously, the attribute values may be pre-determined to reflect various qualities of the objects depicted by the images. In some embodiments, each second image is selected to have an attribute value that is the same as or similar to one or more of the attribute values associated with the first images. Selecting a second image to have an attribute value similar to or the same as one or more of the attribute values associated with the first images is advantageous because, to a software application, such as an Internet bot, the second image(s) would to appear to be similar to at least one of the first images based on a data comparison, but can easily be distinguished from the first images by human because the object it depicts belongs to a different category.

Next, the method 400 selects 406 one or more uncategorized images. The one or more uncategorized images may be selected based on pre-determined attribute values, at random, based on evidence that the one or more uncategorized images should be categorized in the first or second image category, a combination of the foregoing, etc.

Next, the method 400 generates and sends 408 a challenge for presentation to a user 116. For example, the challenge generator 210 can select the first and second images based on their corresponding pre-determined attributes values, select the one or more uncategorized images, and then generate the challenge based thereon. The challenge may be generated to include an instruction describing an action for the user 116 to perform in association with the first, second, and uncategorized images. For example, the challenge may include an instruction for the user 116 to select the images which belong, or do not belong, to a particular category, as discussed above with reference to at least FIG. 3. To send the challenge, the verification engine 104 may send the challenge to the application engine 136 of the application server 134 for transmission via the network 101 to the user device 112 of the user 116, may transmit the challenge directly to the user device 112 of the user 116 via the network 101, or the like.

The method 400 then receives 310 a challenge response and determines 312 the result of the challenge, as described above with reference to FIG. 3. If the result is determined 410 to be un-successful (e.g., by the response analyzer 212), then the method 400 terminates. If the result is determine 410 to be successful (e.g., by the response analyzer 212), the method 400 continues by providing 412 authorization. In some embodiments, the method 400 provides authorization by sending a confirmation signal to the entity of the system 100 that sent the challenge request. For example, upon determining the result to be successful in blocks 312 and 314, the response analyzer 212 may send a confirmation signal to the application engine 136 with the user application 114 confirming that the user 116 successfully completed the challenge, and indicating that the user 116 is most likely human.

Next, the method 400 analyzes the challenge response to determine 414 whether the uncategorized images were associated with the first image category in the challenge response. If so, the method stores 416 evidence that uncategorized images are associated with the first image category and determines 420 whether an evidence threshold has been met to categorize the uncategorized image(s) into the first image category. In some embodiments, the threshold may only require a single association be made by a user in order for the image to be categorized in the first image category, and the method 400 may assign 422 the uncategorized image to the first image category based on the result determined in block 312 (or the evidence stored for the result). In other embodiments, the threshold may require more than one association to have been made in order to make the assignment in block 422. For example, the method 400 may query a data store for evidence from challenge responses that were previously received and which associated the uncategorized image with the first image category, and may determine the evidence threshold to be met based on the evidence retrieved and/or the result determined in block 312 (or the evidence for the result), and categorize the uncategorized image based thereon.

In some embodiments, to avoid falsely categorizing the uncategorized image(s), a plurality of associations (e.g., 2 to 200 or more) could be required to satisfy the evidence threshold in block 420. Further, a non-association/conflicting association of the uncategorized image(s) may not be definitive evidence that the uncategorized image(s) do not belong in the first image category. Rather, using the evidence stored the data store for the uncategorized image(s), the associations and non-associations of the uncategorized image(s) may both be analyzed, and if enough associations are received to overcome any non-association/conflicting association, the uncategorized image(s) may still be categorized in the first image category.

In some embodiments, the learning module 214 performs the operations in blocks 414, 416, 418, 420, and 422. If, in block 414, the method 400 determines that the uncategorized image(s) are not associated with the first image category in the challenge response, the method 400 stores 418 evidence of such and then terminates.

To further illustrate various aspects of the method 400, the following example is provided. The challenge sent to the user 116 in block 408 may instruct the user 116 to indicate which of the images included in the challenge do not belong to the first image category. Upon receiving the challenge, the user application 114 may display the images to the user 116 and request the user 116 indicate which images do not belong to the first category. The user 116 may then select the second image(s) but leave the first and uncategorized images unselected, and the user application 114 may generate and send a challenge response to the verification engine 104 indicating such. Responsive to receiving the challenge response, the response analyzer 212 may compare the user's selection with the challenge instruction that only the images that do not belong to the first image category be selected, and determine that the user 116 successfully completed the challenge. The learning module 214 can then analyze the challenge response and determine that, since the user did not select the uncategorized image(s), the user implicitly associated the image(s) with the first image category, and stores evidence of this association in the verification data store 106. Next, the learning module 214 can determine whether the total evidence stored in the data store for the uncategorized image(s) is sufficient to justify formally categorizing them into the first image category. In this example, during numerous previous iterations of the method 400, the uncategorized image(s) were associated with the first image category four times, not-associated with the first image category one time, and associated with a conflicting category once. The threshold may require that, if any conflicting evidence exists, a certain ratio of associations to non-associations/conflicting associations must be met, such as 10 to 1. Since the 10 to 1 ratio has not been met in this example, the learning module 214 forgoes categorizing the uncategorized image(s).

FIGS. 5A-D are flowcharts of an example method 500 for challenging a user 116 seeking access to a software service. As illustrated in FIGS. 5A-D, the method 500 includes blocks similar to or the same as those described above for the methods 300 and 400. For convenience and ease of understanding, those blocks have the same reference numerals and perform the same or similar functions, and their description is incorporated by internal reference as indicated.

The method 500 begins by acquiring images. In some embodiments, the method 500 can acquire 502, categorize 504 the images, and then store 508 the images by category. For example, the acquisition module 202 of the verification engine 104 may search various information sources (e.g., the search server 128, the image server 120, etc.) for images, and the categorization module 204 may determine categorization information for the images, categorize the images based on the categorization information, and then store the images in the data store by category. In other embodiments, the method 500 can acquire 506 images that have been pre-categorized and store the images based on their pre-categorization. For example, the application engine 136 may provide an e-commerce marketplace for selling various products and may store images of those products in an image data store (not shown), such as a data store that is the same or substantially similar to the image data store 124, along with information describing attributes and categories for the objects depicted in those images. The acquisition module 202 may aggregate the images (or electronic references thereto) and their corresponding attribute and category information from this image data store 124 and store the images and information in the verification data store 106.

Next, the method 500 determines 510 and stores 512 attribute values for the images. In some embodiments, the attribute generator 206 determines the attribute values for the images and stores them in the verification data store 106. For example, a single attribute value or a plurality of attribute values can be generated by the attribute generator 206 for each image, depending on the objects depicted by each image.

The method 500 can then process 514 the images for obscurity. For example, the method can create a duplicate instance of each image and manipulating the data thereof to obscure the contents of the image from a data perspective. For instance, the pre-processor 208 may resample, reformat, blur, pixelate, de-saturate, or otherwise process the data of each image to produce an image that is more difficult for an agent, such as an automated program like an Internet bot, to analyze and determine its content, but that depicts objects that are still easily recognizable to a human.

The method 500 continues by receiving a challenge request, in a manner similar to or the same as block 302 described above with reference to FIG. 3, and determines 518 one or more challenge parameters for the challenge. In some embodiments, the challenge generator 210 determines one or more challenge parameters. The one or more challenge parameters govern the nature of the challenge and the requirement for its successful completion. In some embodiments, the challenge parameters determine the type of challenge, what images should be sent to the user, what instruction or instruction should be sent to the user, the difficulty or complexity of the challenge, etc. Various examples of the different types of challenges that can be performed by the system 100 are discussed elsewhere herein.

Next, the method 500 determines 520 the first image category and verifies 522 whether the first image category is valid for the locale of the user 116. For example, users in one region or country may be able to readily discern objects belonging to a particular category while users in a different region or country may not, and the method can 500 accommodate for this by selecting a category based on the user's locale. In some embodiments, a table cross-referencing image categories with valid/invalid locales is maintained in the verification data store 106, and the challenge generator 210 queries this table to verify that the first image category to be used is valid for the user's locale.

The method 500 continues by selecting 402 two or more first images from the first image category based on the attribute values pre-determined for those images, as previously discussed above. Next, the method 500 determines 524 the second image category. In some embodiments, to determine the first and second image categories, the challenge generator 210 selects the categories at random. In other embodiments, to determine the first and second image categories, the challenge generator 210 selects categories that are sufficiently distinct so as not to provide images that could conceivably belong to either the first or second categories.

Next, as previously discussed above, the method 500 performs the operations of blocks 404, 406, 408, 310, 312, 410, 412, 414, 416, 418, 420, and 422. In block 410, if the method 500 determines that the user did not successfully complete the challenge, the method proceeds to block 526 and determines 526 whether a subsequent challenge should be generated and send to the user. If so, the method 500 repeats by returning to block 518. If not, the method 500 terminates.

Figure 6:
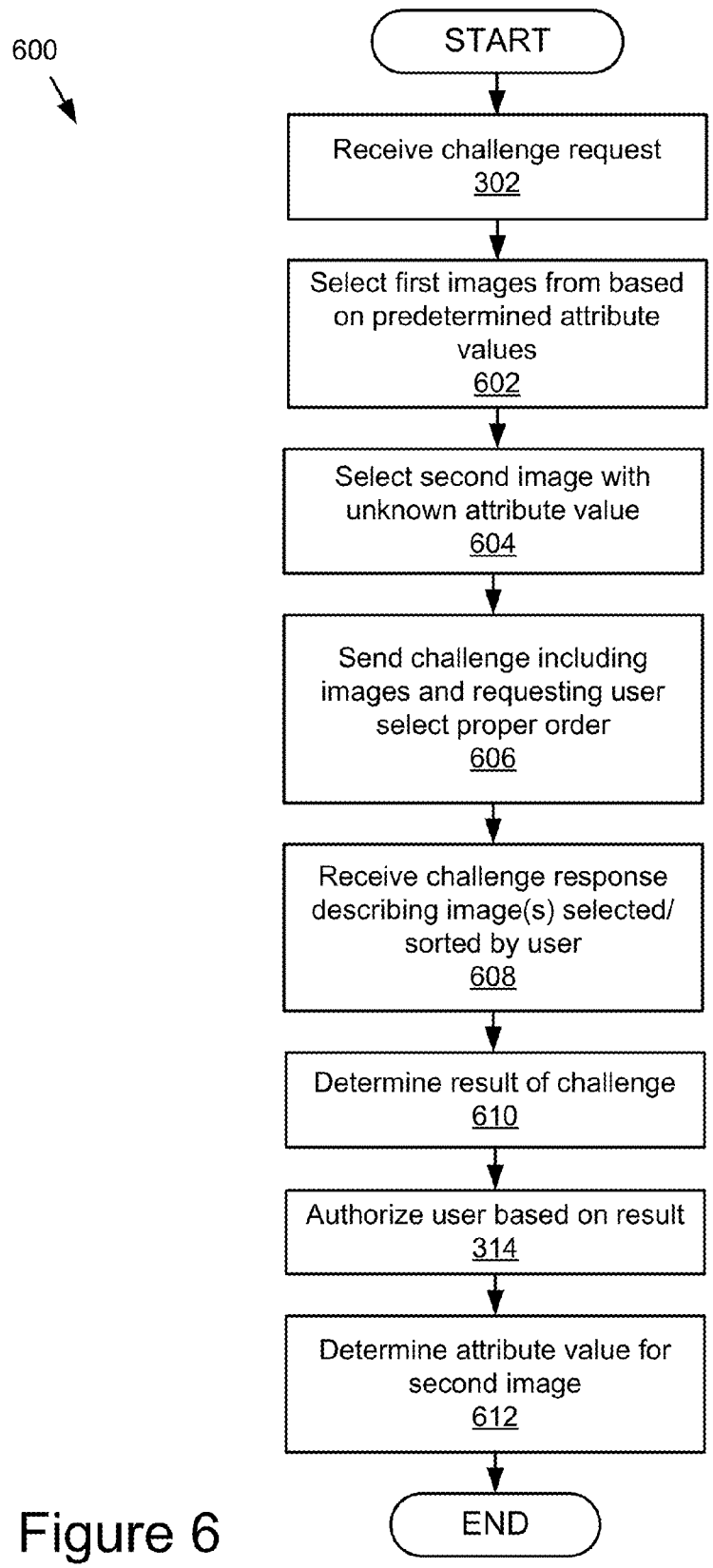
FIG. 6 is a flowchart of an example method for challenging a user seeking access to a software service.

FIG. 6 is a flowchart of an example method for challenging a user 116 seeking access to a software service. As illustrated in FIG. 6, the method 600 includes blocks similar to or the same as those described above for the method 300. For convenience and ease of understanding, those blocks have the same reference numerals and perform the same or similar functions, and their description is incorporated by internal reference as indicated.

The method 600 begins by receiving 302 a challenge request, as described above with reference to FIG. 3, and then continues by selecting 602 two or more first images based on attribute values pre-determined for those images and selecting 604 a second image with an unknown attribute value. In some embodiments, the challenge generator 210 performs the selection and selects the two or more first images based on pre-determined parameter. For example, the criteria may require the images to depict objects having common attributes (e.g., weight, size, age, functionality, texture, etc.), but with different values for those attributes, and the challenge generator 210 may select the two or more first images based on the attributes and values. For instance, the criteria may specify that each of the first images depict an object having a discernible weight but with a different weight value from the other first images, and the challenge generator 210 may select five images depicting five different objects that range from light (e.g., 1 lb.) to heavy (e.g., 1 ton).

Next, the method 600 generates and sends 606 a challenge including the first and second images for display to a user. The user may be the user associated with the challenge request. The challenge may include an instruction requesting the user to select or sort (e.g., associate, rank, or otherwise organize) the images in a specified order. For example, the challenge may instruct user to select or sort the images in ascending/descending order of weight, size, age, or any other applicable attribute.

Responsive to sending the challenge in block 606, the method 600 receives 608 a challenge response describing the selection or sorting performed by the user, and determines 610 a result of the challenge. In some instances, the response analyzer 212 of the verification engine 104 may receive 608 the challenge response and make the determination 610. The challenge response may describe the action performed by the user in association with the images included in the challenge. For example, the challenge response may include data describing the order in which the images were selected or sorted. The method 600 may compare the action performed by the user to the instruction included in the challenge to score the user's performance. In some embodiments, the method 600 may allow for a small amount of user error when determining whether the user successfully completed the challenge. For example, if the user selected or sorted at least 70% of the first images correctly, the method 600 may determine a successful result. In other examples, a successful result may require that the user select or sort (e.g., associate, rank, or otherwise organize) at least 75%, 80%, 85%, 90%, 95%, 100%, etc. of the first images correctly. Other percentages or criteria are also contemplated.

Next, the method 600 authorizes 314 the user based on the result, as described above with reference to at least FIG. 3, and then determines 612 an attribute value for the second image based on the result. In some embodiments, if the result was unsuccessful, the method 600 omits the determination 612 and terminates. In other embodiments, if the result was successful, the method 600 determines an attribute value for the second image based on the pre-determined attributes used to select the first images and the order in which the second image was selected or sorted (e.g., associated, ranked, or otherwise organize) relative to the first images in the challenge response. For example, if the first images were selected based on the weight of the objects they depict, the attribute determined for the second image would for the weight of the object depicted by it, and the value for this attribute would be based on how it was selected or sorted relative to the first images. By way of illustration, if the first images depict objects that appear to be roughly the same size in the images, but to a user, are discernible as having different sizes (e.g., a doll, a bicycle, a car, a tractor, a house); the second image depicts a chair; and the challenge response orders the second image in-between the image of the doll and the image of a bicycle, the attribute value determined for the second image would reflect that it is smaller than a bicycle and bigger than a doll. Once the operations in block 612 are complete, the method 600 is complete and ends.

It should be understood that the examples and example embodiments described herein are provided by way of illustration, and should not be considered limiting. Moreover, while the example methods 300-600 are described within the context of first and second images, and first and second image categories, it should be understood that any number of images and categories may be used. Moreover, the usage of the terms first, second, etc., does not necessarily imply a specific order or rank, and is used in some cases to help the reader discern between various objects, items, elements, etc.

Additionally, it should be understood that the methods 300-600 are provided by way of example, and the other variations and combinations of these methods, as well as other methods, are contemplated. For example, various operations of the method 300 may be expanded upon by corresponding operations of the methods 400, 500, and/or 600. In another example, the various operations of the method 600, such as the image selection and attribute determination blocks, may be substituted for similar operations discussed with reference to methods 300, 400, and/or 500. In other examples, other method variations may be produced by concatenating and/or substituting various blocks, all of which are encompassed by the present disclosure. Further, it should be understood that, in some instances, the methods 300-600 may be iterated multiple times until a successful result has been achieved.

Example User Interfaces

Figure 7:
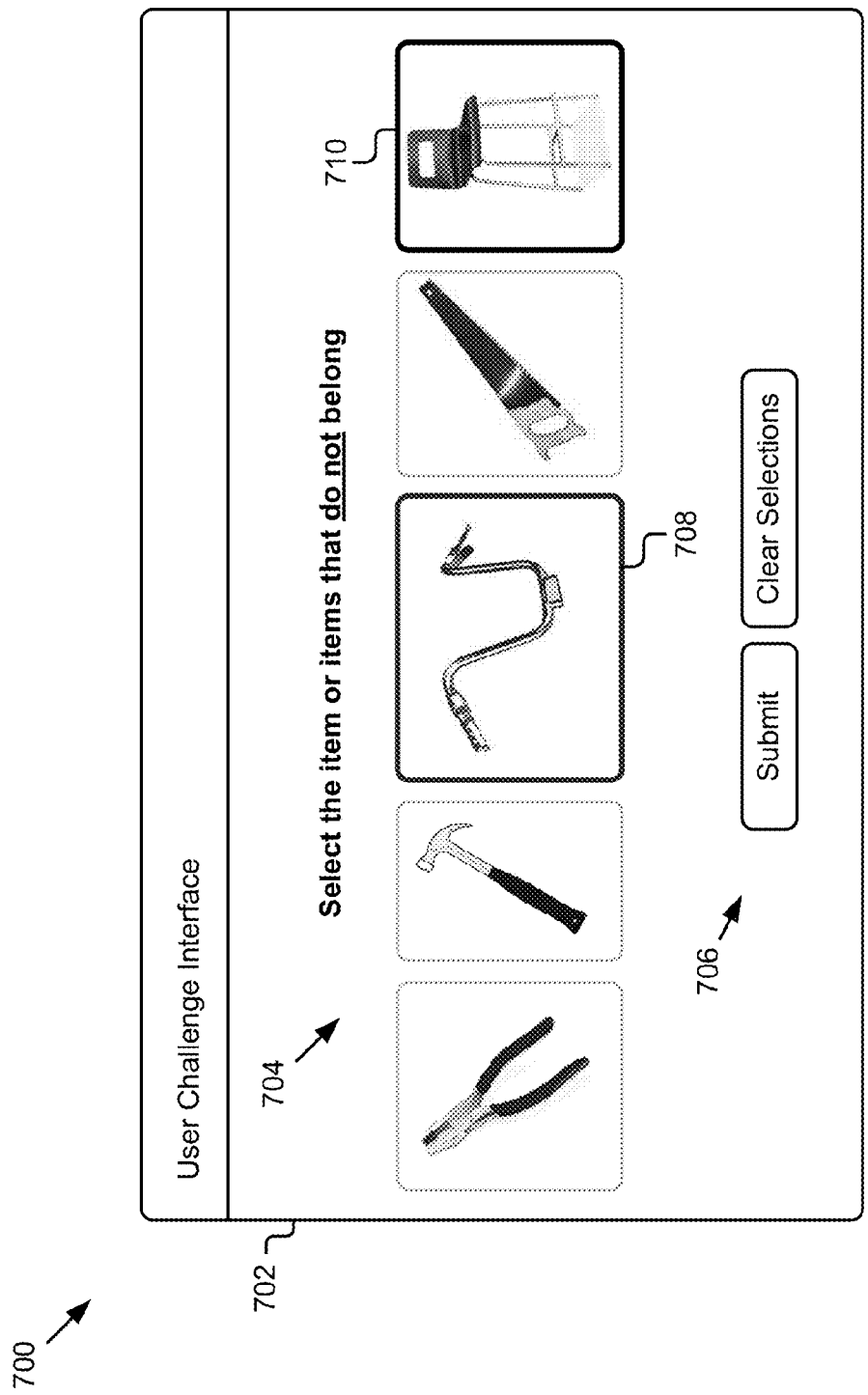
FIGS. 7 and 8 are graphic representations of example user challenge interfaces.
Figure 8:
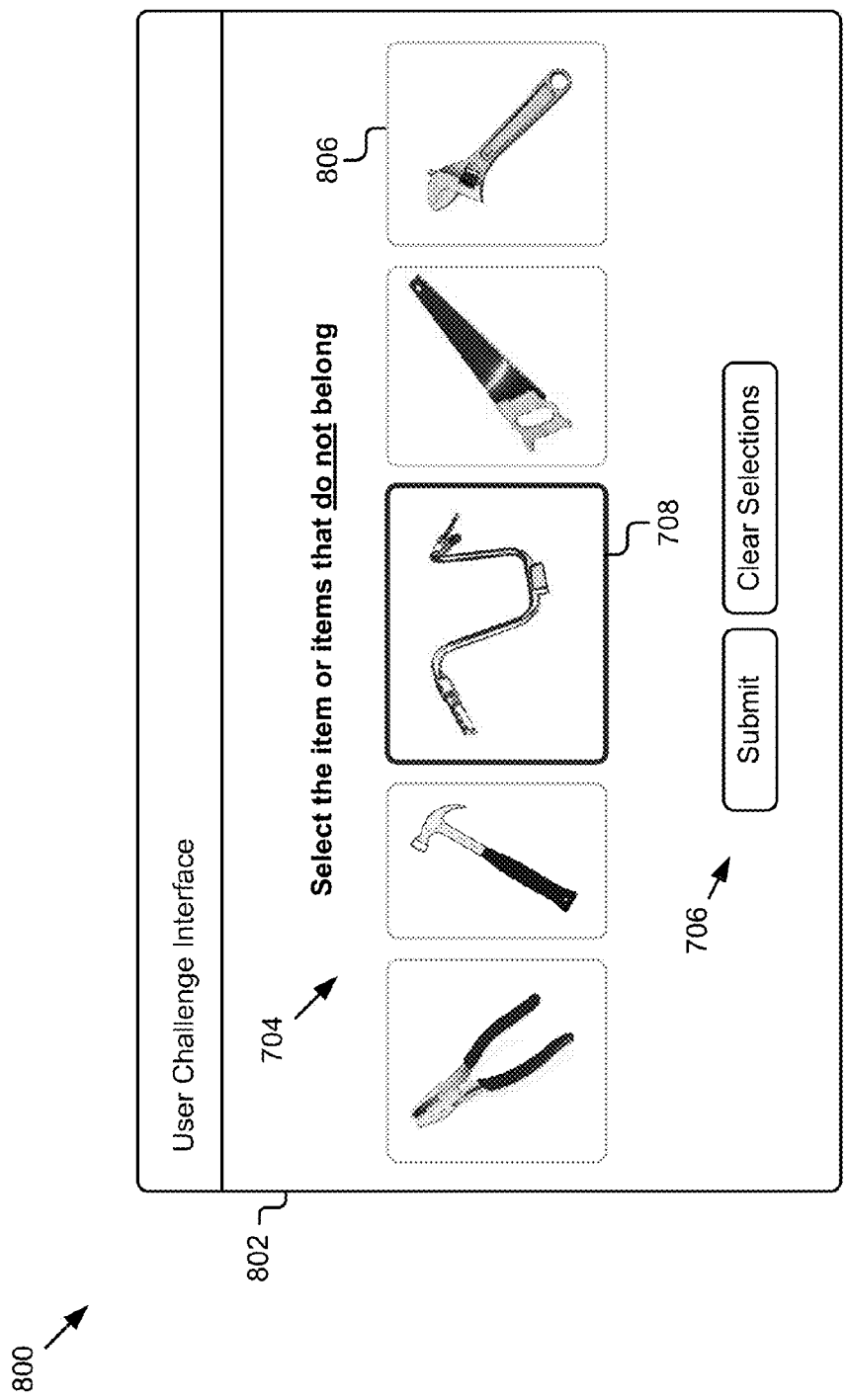

FIGS. 7 and 8 are graphic representations of an example user challenge interfaces 700 and 800, respectively. In FIG. 7, the user interface 700, which may be generated and displayed by the user application 114, includes a window 702 having a challenge region 704 for displaying a challenge and user-selectable buttons 706 for submitting a challenge response. The challenge region 704 includes a plurality of image tiles with which the user can interact, and an instruction for the user to perform a particular action in association with the images. The image tiles depict the images included in the challenge. In the depicted embodiment, there are five image tiles. Three of the image tiles represent images selected from a first image category. More specifically, three of the image tiles display images of hand tools selected from a hardware>tools>hand tools category. The other two image tiles, 708 and 710, respectively represent an image selected from a second image category and an uncategorized image.

In FIG. 7, following the instruction included in the challenge region 704, a user 116 using input device of his/her user device 112 has selected image tiles 708 and 710 as not belonging to the first image category. If the user then selects the user-selectable button labeled "Submit," the user application 114 generates a challenge response indicating that the images displayed in the image tiles 708 and 710 were selected by the user 116, and then sends this challenge response via the network 101 to the verification engine 104. As a further example, since a user selected image tile 710 of a chair, which reflects an uncategorized image, as not belonging to the first category (e.g., hand tools), the response analyzer 212 may store evidence of such for later use when determining a proper category for the image.

While the challenge depicted in the challenge region 704 includes five images, the challenge may include any number of categorized or uncategorized images, which can be displayed to the user in the challenge region 704. For example, the challenge may include sixteen images, with thirteen being selected from a first image category and three being selected from one or more other image categories.

In FIG. 8, the user interface 800, which may be generated and displayed by the user application 114, includes a window 802 having the challenge region 704 and user-selectable buttons 706 described above with reference to FIG. 7. As with FIG. 7, in the depicted embodiment depicted in FIG. 8, there are five image tiles. Three of the image tiles represent images selected from a first image category. More specifically, three of the image tiles display images of hand tools selected from a hardware>tools>hand tools category The other two image tiles, 708 and 806, respectively represent an image selected from a second image category and an uncategorized image.

However, in contrast with FIG. 7, the image tile 806 including the uncategorized image depicts a hand tool that could be appropriately associated with the images belonging to the first image category. As such, following the instruction included in the challenge region 704, a user 116 using input device of his/her user device 112 has only selected image tile 708 as not belonging to the first image category, thus implying that the uncategorized image represented in image tile 806 belongs to the first image category. If the user then selects the user-selectable button labeled "Submit," the user application 114 generates a challenge response indicating that the image displayed in the image tile 708 was selected by the user, and then sends this challenge response via the network 101 to the verification engine 104. Upon receiving the challenge response, the response analyzer 212 may store evidence that the image of the wrench should be categorized in the first image category (e.g., as a hand tool within the main hardware category), and, if an evidence threshold has been met, may proceed to categorize the image of the wrench into the first image category.

It should also be understood that the user interfaces 700 and 800 are provided by way of example and that many other user interface configurations are also contemplated. For example, the user challenge region 704 and user-selectable buttons 706 may be integrated into a log-in interface with interface elements for the user to input user-credentials. In other examples, the user challenge region 704 and user-selectable buttons 706 may be integrated into an entry portal of an online service (e.g., webpage, start-page, etc.) operated by the application server 134, search server 128, image server 120, user device 112, or other entity coupled to the network 101. In these or other examples, user interfaces may include additional information, elements, have a variety of distinct formats, positions within the window, and/or combinations, or may exclude various elements or information; all of which are encompassed by the scope of the present disclosure.

Various example embodiments for verifying that a user device, which is seeking access to a software service, is being operated by a person have been described. In the above description, for purposes of explanation, numerous specific details are set forth in order to provide a thorough understanding of the disclosure. It should be understood that the technology described in the various example embodiments can be practiced without these specific details. In other instances, structures and devices were shown in block diagram form in order to avoid obscuring the disclosure. For example, the present disclosure was described in some embodiments above with reference to user interfaces and particular hardware. However, the present disclosure applies to any type of computing device that can receive data and commands, and any devices providing services. Moreover, the present disclosure was described above primarily in the context of challenge-response testing. However, it should be understood that the present disclosure applies to any type of communication between nodes of a network.

To ease description, some elements of the system 100 may be referred to using the labels first, second, third, etc. These labels are intended to help to distinguish the elements but do not necessarily imply any particular order or ranking unless indicated otherwise. Additionally, reference in the specification to "one embodiment," "an embodiment" or "some embodiments" means that a particular feature, structure, or characteristic described in connection with the embodiment is included in at least one embodiment of the disclosure. The appearances of the phrase "in one embodiment" or "in some embodiments" in various places in the specification are not necessarily all referring to the same embodiment(s).

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "ranking" or "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, wireless adapters, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps/blocks. The required structure for a variety of these systems will appear from the description above. In addition, the present disclosure is not described with reference to any particular programming language. It will be appreciated that a variety of programming languages may be used to implement the teachings of the disclosure as described herein.

It is intended that the scope of the disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, it should be understood that the modules, routines, features, attributes, methodologies and other aspects of the disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the disclosure is in no way limited to implementation in any specific programming language, or for any specific operating system or environment. Accordingly, the disclosure is intended to be illustrative, but not limiting, of the subject matter set forth in the following claims.

What is claimed is:

1. A computer-implemented method comprising:
receiving, using one or more computing devices, a challenge request to verify a person is operating a user device;
selecting, using the one or more computing devices, two or more first images from a first image category based on two or more attribute values, which correspond to the two or more first images, being substantially disparate or substantially similar relative to one another, each of the two or more attribute values quantifying a visually perceptible attribute of an object depicted by a corresponding image of the two or more first images;
selecting, using the one or more computing devices, one or more second images from one or more second image categories based on one or more attribute values, which correspond to the one or more second images, being substantially disparate or substantially similar relative to the two or more attribute values corresponding to the two or more first images, the one or more second image categories being distinct from the first image category, each of the one or more attribute values quantifying a visually perceptible attribute of an object depicted by a corresponding image of the one or more second images;
sending, using the one or more computing devices, a challenge to the user device for presentation to the person, the challenge including a challenge parameter and data describing the two or more first images and the one or more second images, the challenge parameter requiring the person to categorize or sort one or more images from one or more of the two or more first images and the one or more second images;
receiving, using the one or more computing devices, a challenge response from the user device describing a user interaction with at least one image from among the two or more first images and the one or more second images; and
determining, using the one or more computing devices, a result of the challenge to be successful based on the challenge response and the challenge parameter.

2. The computer-implemented method of claim 1, comprising:
providing, using the one or more computing devices, authorization for the user device to access a software service, wherein the determining includes determining the result of the challenge to be successful at least because the user interaction satisfies the challenge parameter.

3. The computer-implemented method of claim 1, comprising:
aggregating, from one or more information sources using the one or more computing devices, a plurality of images, attributes of objects depicted by the images of the plurality, and categories for the images of the more plurality; and
determining, using the one or more computing devices, attribute values for the images of the plurality based on the attributes of the objects depicted by the images of the plurality, the attribute values quantifying visually perceptible attributes of the objects depicted by the images of the plurality.

4. The computer-implemented method of claim 3, wherein determining the attribute values for the images of the plurality includes:
quantifying, using the one or more computing devices, at least one of a size, shape, weight, cost, price, age, texture, color, sheen, structure, configuration, and material of an object depicted by each of the images of the plurality.

5. The computer-implemented method of claim 1, further comprising:
selecting, using the one or more computing devices, an image having an unknown attribute value, wherein the challenge further includes the image and the two or more first images, and the user interaction sorts the image and the two or more first images in a particular order based on a user perception of attributes corresponding to objects depicted by the image and the two or more first images; and
determining, using the one or more computing devices, an attribute value for the image based on the order in which the image is sorted relative to the two or more first images in the challenge response and the result of the challenge being successful.

6. The computer-implemented method of claim 1, wherein
the two or more first images are selected from the first category and the one or more second images are selected from the one or more second image categories based on the two or more attribute values and the one or more attribute values being substantially similar, or
the two or more first images are selected from the first category based on the two or more attribute values being substantially disparate and the one or more second images are selected from the one or more second image categories based on the one or more attribute values being substantially similar to the two or more attribute values.

7. The computer-implemented method of claim 1, comprising:
categorizing, using the one or more computing devices, a plurality of images into a plurality of image categories including the first image category and the one or more second image categories.

8. The computer-implemented method of claim 1, comprising:
selecting, using the one or more computing devices, an uncategorized image, the challenge further including data describing the uncategorized image and the challenge response further describing a user interaction with the uncategorized image associating the uncategorized image with the first image category or the one or more second image categories;
querying, using the one or more computing devices, a data store for evidence associating the uncategorized image with the first image category or the one or more second image categories, the evidence based on one or more challenge responses that were previously received and which associate the uncategorized image with the first image category or the one or more second image categories;

determining, using the one or more computing devices, an evidence threshold to be met based on the evidence and the result; and categorizing, using the one or more computing devices, the uncategorized image into the first image category or the one or more second image categories based on the user interaction with the uncategorized image, the result of the challenge being successful, and the evidence threshold being met.

9. The computer-implemented method of claim 1, wherein the challenge parameter is one of a requirement that the user interaction selects the two or more first images that belong to the first image category and not select the one or more second images that belong to the one or more second image categories, a requirement that the user interaction selects the one or more second images that belong to the one or more second image categories and not select the two or more first images that belong to the first image category, and a requirement that the user interaction sorts one or more of the two or more first images and the one or more second images in a particular order based on a user perception of attributes corresponding to objects depicted by the two or more first images and the one or more second images.

10. A computer program product comprising a non-transitory computer-usable medium including instructions which, when executed by a computer, cause the computer to:

receive a challenge request to verify a person is operating a user device;

select two or more first images from a first image category based on two or more attribute values, which correspond to the two or more first images, being substantially disparate or substantially similar relative to one another, each of the two or more attribute values quantifying a visually perceptible attribute of an object depicted by a corresponding image of the two or more first images;

select one or more second images from one or more second image categories based on one or more attribute values, which correspond to the one or more second images, being substantially disparate or substantially similar relative to the two or more attribute values corresponding to the two or more first images, the one or more second image categories being distinct from the first image category, each of the one or more attribute values quantifying a visually perceptible attribute of an object depicted by a corresponding image of the one or more second images;

send a challenge to the user device for presentation to the person, the challenge including a challenge parameter and data describing the two or more first images and the one or more second images, the challenge parameter requiring the person to categorize or sort one or more images from one or more of the two or more first images and the one or more second images;

receive a challenge response from the user device describing a user interaction with at least one image from among the two or more first images and the one or more second images; and determine a result of the challenge to be successful based on the challenge response and the challenge parameter.

11. The computer program product of claim 10, wherein the instructions further cause the computer to:

provide authorization for the user device to access a software service, wherein to determine the result includes determining the result of the challenge to be successful at least because the user interaction satisfies the challenge parameter.

12. The computer program product of claim 10, wherein the instructions further cause the computer to:

aggregate, from one or more information sources, a plurality of images, attributes of objects depicted by the images of the plurality, and categories for the images of the plurality; and determine attribute values for the images of the plurality based on the attributes of the objects depicted by the images of the plurality, the attribute values quantifying visually perceptible attributes of the objects depicted by the images of the plurality.

13. The computer program product of claim 12, wherein to determine the attribute values for the images of the plurality includes:

quantifying at least one of a size, shape, weight, cost, price, age, texture, color, sheen, structure, configuration, and material of an object depicted by each of the images of the plurality.

14. The computer program product of claim 10, wherein the instructions further cause the computer to:

select an image having an unknown attribute value, wherein the challenge further includes the image and the two or more first images, and the user interaction sorts the image and the two or more first images in a particular order based on a user perception of attributes corresponding to objects depicted by the image and the two or more first images; and determine an attribute value for the image based on the order in which the image is sorted relative to the two or more first images in the challenge response and the result of the challenge being successful.

15. The computer program product of claim 10, wherein the two or more first images are selected from the first category and the one or more second images are selected from the one or more second image categories based on the two or more attribute values and the one or more attribute values being substantially similar, or the two or more first images are selected from the first category based on the two or more attribute values being substantially disparate and the one or more second images are selected from the one or more second image categories based on the one or more attribute values being substantially similar to the two or more attribute values.

16. The computer program product of claim 10, wherein the instructions further cause the computer to:

categorize a plurality of images into a plurality of image categories including the first image category and the one or more second image categories.

17. The computer program product of claim 10, wherein the instructions further cause the computer to:

select an uncategorized image, the challenge further including data describing the uncategorized image and the challenge response further describing a user interaction with the uncategorized image associating the uncategorized image with the first image category or the one or more second image categories;

query a data store for evidence associating the uncategorized image with the first image category or the one or more second image categories, the evidence based on one or more challenge responses that were previously received and which associate the uncategorized image with the first image category or the one or more second image categories;

determine an evidence threshold to be met based on the evidence and the result; and categorize the uncategorized image into the first image category or the one or more second image categories based on the user interaction with the uncategorized image, the result of the challenge being successful, and the evidence threshold being met.

18. The computer program product of claim 10, wherein the challenge parameter is one of a requirement that the user interaction selects the two or more first images that belong to the first image category and not select the one or more second images that belong to the one or more second image categories, a requirement that the user interaction selects the one or more second images that belong to the one or more second image categories and not select the two or more first images that belong to the first image category, and a requirement that the user interaction sorts the two or more first images and the one or more second images in a particular order based on a user perception of attributes corresponding to objects depicted by the two or more first images and the one or more second images.

19. A system comprising:
one or more processors, the processors being configured to:
receive a challenge request to verify a person is operating a user device;
select two or more first images from a first image category based on two or more attribute values, which correspond to the two or more first images, being substantially disparate or substantially similar relative to one another, each of the two or more attribute values quantifying a visually perceptible attribute of an object depicted by a corresponding image of the two or more first images;
select one or more second images from one or more second image categories based on one or more attribute values, which correspond to the one or more second images, being substantially disparate or substantially similar relative to the two or more attribute values corresponding to the two or more first images, the one or more second image categories being distinct from the first image category, each of the one or more attribute values quantifying a visually perceptible attribute of an object depicted by a corresponding image of the one or more second images;
send a challenge to the user device for presentation to the person, the challenge including a challenge parameter and data describing the two or more first images and the one or more second images, the challenge parameter requiring the person to categorize or sort one or more images from one or more of the two or more first images and the one or more second images;
receive a challenge response from the user device describing a user interaction with at least one image from among the two or more first images and the one or more second images; and
determine a result of the challenge to be successful based on the challenge response and the challenge parameter.

20. The system of claim 19, wherein the one or more processors are further configured to:
provide authorization for the user device to access a software service, wherein to determine the result includes determining the result of the challenge to be successful at least because the user interaction satisfies the challenge parameter.

21. The system of claim 19, wherein the one or more processors are further configured to:
aggregate, from one or more information sources, a plurality of images, attributes of objects depicted by the images of the plurality, and categories for the images of the plurality; and
determine attribute values for the images of the plurality based on the attributes of the objects depicted by the images of the plurality, the attribute values quantifying visually perceptible attributes of the objects depicted by the images of the plurality.

22. The system of claim 21, wherein to determine the attribute values for the images of the plurality includes:
quantifying, using the one or more computing devices, at least one of a size, shape, weight, cost, price, age, texture, color, sheen, structure, configuration, and material of an object depicted by each of the images of the plurality.

23. The system of claim 19, wherein the one or more processors are further configured to:
select an image having an unknown attribute value, wherein the challenge further includes the image and the two or more first images, and the user interaction sorts the image and the two or more first images in a particular order based on a user perception of attributes corresponding to objects depicted by the image and the two or more first images; and
determine an attribute value for the image based on the order in which the image is sorted relative to the two or more first images in the challenge response and the result of the challenge being successful.

24. The system of claim 19, wherein
the two or more first images are selected from the first category and the one or more second images are selected from the one or more second image categories based on the two or more attribute values and the one or more attribute values being substantially similar, or
the two or more first images are selected from the first category based on the two or more attribute values being substantially disparate and the one or more second images are selected from the one or more second image categories based on the one or more attribute values being substantially similar to the two or more attribute values.

25. The system of claim 19, wherein the one or more processors are further configured to:
categorize a plurality of images into a plurality of image categories including the first image category and the one or more second image categories.

26. The system of claim 19, wherein the one or more processors are further configured to:
select an uncategorized image, the challenge further including data describing the uncategorized image and the challenge response further describing a user interaction with the uncategorized image associating the uncategorized image with the first image category or the one or more second image categories;
query a data store for evidence associating the uncategorized image with the first image category or the one or more second image categories, the evidence based on one or more challenge responses that were previously received and which associate the uncategorized image with the first image category or the one or more second image categories;
determine an evidence threshold to be met based on the evidence and the result; and categorize the uncategorized image into the first image category or the one or more second image categories based on the user interaction with the uncategorized image, the result of the challenge being successful, and the evidence threshold being met.

27. The system of claim 19, wherein the challenge parameter is one of a requirement that the user interaction selects the two or more first images that belong to the first image category and not select the one or more second images that belong to the one or more second image categories, a requirement that the user interaction selects the one or more second images that belong to the one or more second image categories and not select the two or more first images that belong to the first image category, and a requirement that the user interaction sorts the two or more first images and the one or more second images in a particular order based on a user perception of attributes corresponding to objects depicted by the two or more first images and the one or more second images.

\* \* \* \* \*